United States Patent
Yudin et al.

(10) Patent No.: US 12,060,371 B2
(45) Date of Patent: *Aug. 13, 2024

(54) BORONIC ESTERS AND METHODS FOR MAKING THE SAME

(71) Applicant: THE GOVERNING COUNCIL OF THE UNIVERSITY OF TORONTO, Toronto (CA)

(72) Inventors: Andrei K. Yudin, Toronto (CA); Aleksandra Holownia, Mississauga (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,079

(22) Filed: Mar. 22, 2022

(65) Prior Publication Data
US 2022/0220130 A1    Jul. 14, 2022

Related U.S. Application Data

(63) Continuation of application No. 16/894,215, filed on Jun. 5, 2020, now Pat. No. 11,312,731.

(30) Foreign Application Priority Data

Jun. 6, 2019   (GB) .................................. 1908095

(51) Int. Cl.
  *C07F 5/02*   (2006.01)
  *C07F 5/04*   (2006.01)
(52) U.S. Cl.
  CPC ............... *C07F 5/025* (2013.01); *C07F 5/04* (2013.01)
(58) Field of Classification Search
  CPC ...................................................... C07F 5/025
  See application file for complete search history.

(56) References Cited

U.S. PATENT DOCUMENTS

| | | |
|---|---|---|
| 8,013,203 B2 | 9/2011 | Burke et al. |
| 9,120,826 B1 | 9/2015 | Sydora et al. |
| 2011/0201806 A1 | 8/2011 | Burke et al. |
| 2014/0094615 A1 | 4/2014 | Burke et al. |
| 2016/0376292 A1* | 12/2016 | Burke ............... C07F 5/025 556/7 |

FOREIGN PATENT DOCUMENTS

| | | |
|---|---|---|
| EP | 3018136 A1 | 5/2016 |
| WO | 2009014550 A1 | 1/2009 |
| WO | 2011103435 A2 | 8/2011 |
| WO | 2012149182 A2 | 11/2012 |
| WO | 2017027434 A1 | 2/2017 |

OTHER PUBLICATIONS

He et al. ("α-Borylcarbonyl compounds:from transient intermediates to robust building blocks", Dalton Transactions, vol. 43, issue 30, May 2014, p. 11434-11451) (Year: 2014).*

Lee et al. ("Amine hemiliability enables boron to mechanistically resemble either hydride or proton", Nature Chemistry, vol. 10, Jul. 2018, pp. 1062-1070).

* cited by examiner

*Primary Examiner* — Rosalynd A Keys
(74) *Attorney, Agent, or Firm* — Norton Rose Fulbright Canada LLP

(57) ABSTRACT

There is provide herein a compound of Formula (1):

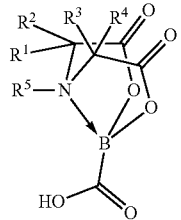

Formula (1)

wherein $R^1$, $R^2$, $R^3$, $R^4$, and $R^5$ are each independently H or an organic group.

5 Claims, 1 Drawing Sheet

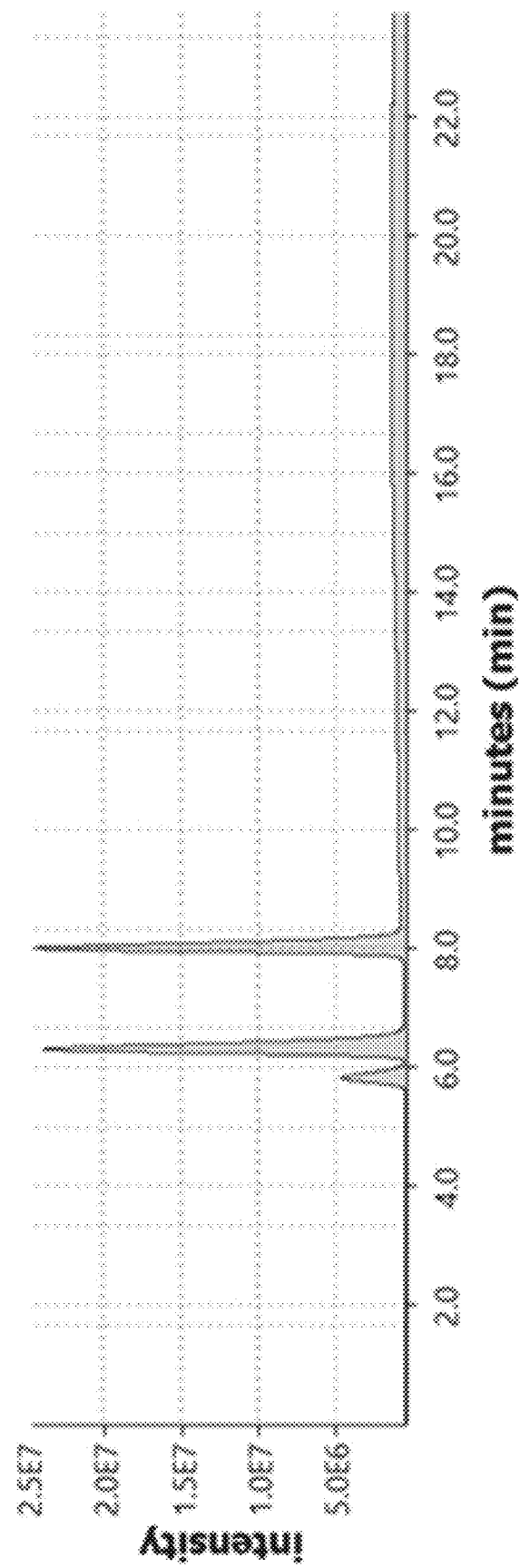

BORONIC ESTERS AND METHODS FOR MAKING THE SAME

CROSS REFERENCE TO RELATED APPLICATION AND CLAIM OF PRIORITY

This application is a continuation of U.S. patent application Ser. No. 16/894,215, filed Jun. 5, 2020, which claims all benefit including priority to United Kingdom Patent Application No. GB1908095.1, filed Jun. 6, 2019 entitled, "NOVEL BORONIC ESTERS AND METHODS FOR MAKING THE SAME". The entire contents of each of these applications is hereby incorporated by reference in their entireties.

FIELD OF THE INVENTION

The invention relates to boronic esters and methods for making them, and in particular, relates to borylated building block compounds.

BACKGROUND OF THE INVENTION

Organoboronic acids and their derivatives are widely utilized building blocks in chemical synthesis.[1] The reactivity of these molecules is due to the accessibility of the vacant p-orbital at the trivalent boron center. This Lewis acidity, however, is a "double-edged sword" as $sp^2$-hybridized boron species are often too reactive to survive chemical transformations during late-stage functional group manipulation. The emergence of stable tetracoordinate organoboronic derivatives, such as organotrifluoroborates[2] and N-methyliminodiacetyl (MIDA) boronates[3] as boronic acid surrogates has opened up new opportunities to address this problem. The corresponding organoboron compounds are stable under a variety of conditions wherein other functional groups are chemoselectively transformed, leaving the boryl functionality available for downstream transformations.[4,5] The tetracoordinate nature of the $sp^3$-boron in these molecules inhibits undesired reactions typical of trivalent organoboron compounds.

The recent development of MIDA boronate-derived α-boryl aldehydes/carboxylic acids[6] and their pinene-analogues [7] has further highlighted the prominent effect of $sp^3$-boron centers in chemoselective transformations. Such compounds are also described in U.S. Pat. No. 8,013,203. While functional group manipulations remote to the tetracoordinate boryl groups are well documented, geminal functionalization, particularly oxidative transformation directly at the α-position of the boron center, has remained underexplored.
[4r,5g]

SUMMARY OF THE INVENTION

In an aspect, there is provided a compound of Formula (1):

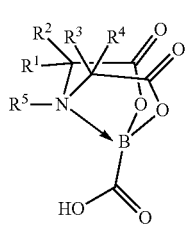

Formula (1)

wherein $R^1$, $R^2$, $R^3$, $R^4$, and $R^5$ are each independently H or an organic group.

In another aspect, there is provided a compound of Formula (2):

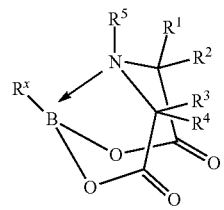

Formula (2)

wherein $R^1$, $R^2$, $R^3$, $R^4$, $R^5$, and $R^x$ are each independently H or an organic group.

In another aspect, there is provided a process for preparing the compound of Formula (1) comprising oxidizing the compound of Formulas (2):

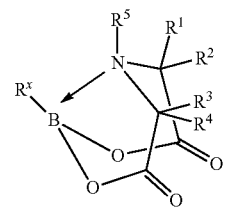

wherein $R^1$, $R^2$, $R^3$, $R^4$, $R^5$, and $R^x$ are each independently H or an organic group.

In another aspect, there is provided a compound of Formula (3):

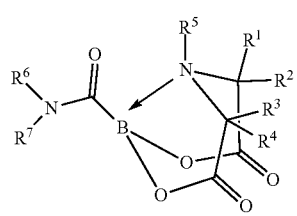

Formula (3)

wherein $R^1$, $R^2$, $R^3$, $R^4$, $R^5$, and $R^6$, and $R^7$ are each independently H or an organic group.

In another aspect, there is provided a process for preparing the compound of Formula (3) comprising reacting the compound of Formula (4):

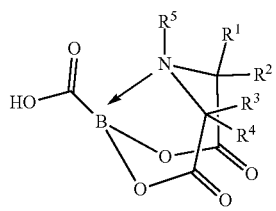

Formula (4)

wherein $R^1$, $R^2$, $R^3$, $R^4$, and $R^5$ and are each independently H or an organic group; with $HNR^6R^7$, wherein $R^6$ and $R^7$ are each independently H or an organic group.

In another aspect, there is provided a compound of Formula (5):

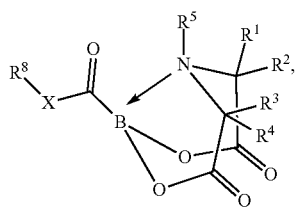

Formula (5)

wherein $R^1$, $R^2$, $R^3$, $R^4$, $R^5$, and $R^8$ are each independently H or an organic group; and X is O or S.

In another aspect, there is provided a process for preparing the compound of Formula (5) comprising reacting the compound of Formula (6):

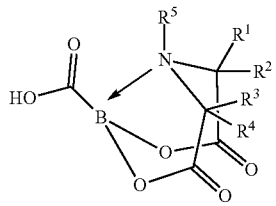

Formula (6)

wherein $R^1$, $R^2$, $R^3$, $R^4$, and $R^5$ and are each independently H or an organic group; with X—$R^8$, wherein $R^8$ is H or an organic group, and X is O or S.

In another aspect, there is provided a process for preparing the compound of Formula (5) comprising reacting the compound of Formula (6), wherein $R^1$, $R^2$, $R^3$, $R^4$, and $R^5$ and are each independently H or an organic group; with Y—$R^9$, wherein $R^9$ is H or an organic group, and Y is a halogen, preferably Br, and X is O.

In another aspect, there is provided a compound of Formula (7):

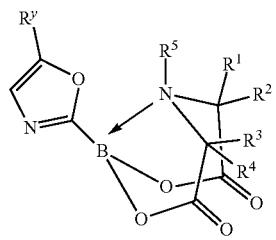

Formula (7)

wherein $R^1$, $R^2$, $R^3$, $R^4$, $R^5$, and $R^y$ are each independently H or an organic group.

In another aspect, there is provided a process for preparing the compound of Formula (7) comprising oxidizing the compound of Formula (8):

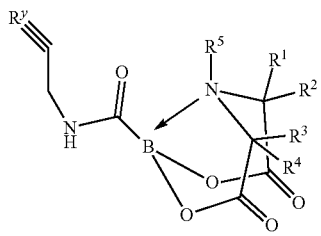

Formula (8)

wherein $R^1$, $R^2$, $R^3$, $R^4$, $R^5$, and $R^y$ are each independently H or an organic group.

In an aspect, there is provided a compound of Formula (9):

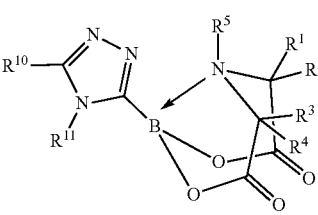

Formula (9)

wherein $R^1$, $R^2$, $R^3$, $R^4$, $R^5$, $R^{10}$, and $R^{11}$ are each independently H or an organic group.

In an aspect, there is provided a process for preparing the compound of Formula (9) comprising reacting the compound of Formula (10):

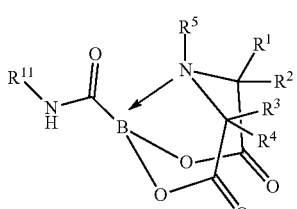

Formula (10)

with the compound of Formula (11):

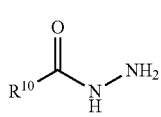

Formula (11)

wherein $R^1$, $R^2$, $R^3$, $R^4$, $R^5$, $R^{10}$, and $R^{11}$ are each independently H or an organic group.

In an aspect there is provided a compound of Formula (12):

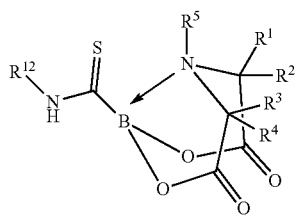

Formula (12)

wherein $R^1$, $R^2$, $R^3$, $R^4$, $R^5$, $R^{10}$, and $R^{12}$ are each independently H or an organic group.

In an aspect there is provided a process for preparing the compound of Formula (12) comprising reducing the compound of Formula (13):

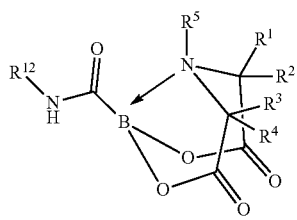

Formula (13)

wherein $R^1$, $R^2$, $R^3$, $R^4$, $R^5$, and $R^{12}$ are each independently H or an organic group.

In an aspect there is provided a compound of Formula (14):

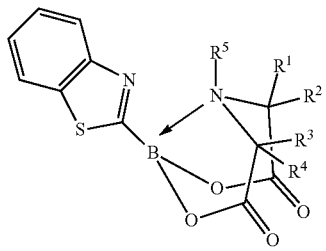

Formula (14)

wherein $R^1$, $R^2$, $R^3$, $R^4$, $R^5$, are each independently H or an organic group.

In an aspect there is provided a process for preparing the compound of Formula (17) comprising reducing the compound of Formula (15):

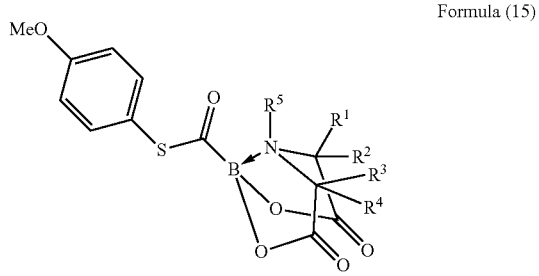

Formula (15)

wherein $R^1$, $R^2$, $R^3$, $R^4$, and $R^5$ are each independently H or an organic group.

In an aspect there is provided a compound of Formula (16):

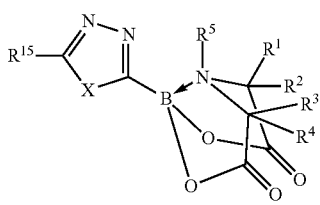

Formula (16)

wherein $R^1$, $R^2$, $R^3$, $R^4$, $R^5$, $R^{10}$, and $R^{15}$ are each independently H or an organic group, and X is O or S.

In an aspect there is provided process for preparing the compound of Formula (16) comprising reacting the compound of Formula (17):

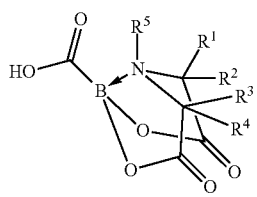

Formula (17)

with the compound of Formula (18):

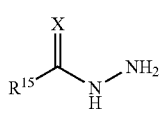

Formula (18)

wherein $R^1$, $R^2$, $R^3$, $R^4$, $R^5$, $R^{10}$, and $R^{15}$ are each independently H or an organic group, and X is S or O.

In an aspect there is provided a compound of Formula (19):

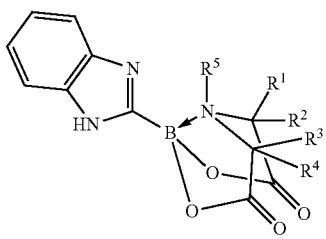

Formula (19)

wherein $R^1$, $R^2$, $R^3$, $R^4$, $R^5$, are each independently H or an organic group.

In an aspect there is provide a process for preparing the compound of Formula (19) comprising reducing the compound of Formula (20):

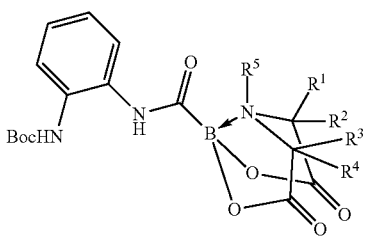

Formula (20)

wherein $R^1$, $R^2$, $R^3$, $R^4$, and $R^5$ are each independently H or an organic group.

DESCRIPTION OF THE DRAWINGS

Reference is now made to the accompanying drawing, in which:

FIG. 1 shows a Chromatogram of GC-TCD Headspace Experiment.

DETAILED DESCRIPTION

In the following description, numerous specific details are set forth to provide a thorough understanding of the invention. However, it is understood that the invention may be practiced without these specific details.

The introduction of boron across molecular frameworks has many advantages in the context of synthetic and biological chemistry. Boron is a versatile synthetic handle capable of participating in many chemical transformations. Additionally, in the context of biology, boron offers a unique mode of biological target engagement. Unlike typical electrophiles, such as epoxides, aldehydes and acrylates, boron can display a number of coordination modes upon interaction with various proteins. Herein, we describe a boronate bound to a single carbon unit in the oxidation state of a carboxylic acid. The synthesis of the boronate, i.e. the C1 boronate, is scalable, operationally straightforward, and utilizes commercially available reagents. The C1 boronate has a number of unique properties, such as its CO releasing ability, enabling its application in biology and/or exploitation in synthesis. Furthermore, the boronate may be a synthetic building block. Since there is only one carbon unit, the C1 boronate provides the modular and versatile entry into diverse and complex molecules. The resulting borylated products derived from the C1 boronate building block may be accessed by established means. The borylated products also may act as novel boron-based protease inhibitors. Additionally, the C1 boronate building block offers an approach to the synthesis of relevant pharmaceuticals.

Throughout the literature, there are a number of reports of borylcarboxylic acids. For example, a class of Lewis-base carboxyboranes—amine carboxyboranes—are considered to be boron analogues of protonated α-amino acids and aliphatic carboxylic acids as a result of the isosteric relationship between B—N and C—C[8][9]. The borylcarboxylic acids are commonly prepared by subjecting the corresponding cyanoborane to a triethyloxonium tetrafluoroborate mediated N-alkylation, followed by acid/base-mediated hydrolysis. The carboxyboranes are able to undergo synthetic manipulations analogous to their corresponding organic derivatives, providing access to ester, amide, hydroxamic acid and peptide derivatives. However, these derivatives have no demonstrated synthetic utility. The amide couplings to access the corresponding carbamoyl boranes are achieved using conditions similar to organic acids. Esterification reactions, on the other hand, are met with a number of challenges. Standard coupling conditions are slow to proceed, as a result of the low acidity of the carboxyborane, and/or lead to unseparable byproducts. Carboxyborane-ammonia complex and dimethylamine-carboxyborane are commercially available. A base-free borylcarboxylic acid has also been developed[10]. The base-free borylcarboxylic acid was achieved by taking boryllithium and subjecting it to $CO_2$. There are no known synthetic applications of this borylcarboxylate. The examples, Supra, describing the lack of utility of certain molecules, demonstrates that, up until now, there has been limited synthetic value of this class of molecules due to the difficulties associated with their preparation and subsequent transformations. Additionally, the lack of utility of the reported boryl acids and their derivatives stems from the inability to engage the C—B bond in classical cross-coupling reactions.

Herein, we describe a carboxy-N-methyliminodiacetic acid (MIDA)-boronate, a compound which unlike the previously disclosed compounds, has the capacity to undergo transformations mediated by boronic acids, such as Suzuki-Miyaura cross-coupling reactions. The carboxy-MIDA-boronate may be accessed through the use of the (MIDA) ligand, which shields boron's empty p orbital and protects it against unwanted reactivity.

In an aspect, there is provided a compound of Formula (1):

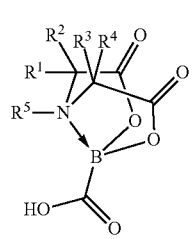

Formula (1)

wherein $R^1$, $R^2$, $R^3$, $R^4$, and $R^5$ are each independently H or an organic group.

The term "group" means a linked collection of atoms or a single atom within a molecular entity, where a molecular entity is any constitutionally or isotopically distinct atom, molecule, ion, ion pair, radical, radical ion, complex, conformer etc., identifiable as a separately distinguishable entity. The description of a group as being "formed by" a particular chemical transformation does not imply that this chemical transformation is involved in making the molecular entity that includes the group.

The term "organic group" means a group containing at least one carbon atom. Preferably, the organic group comprises 1 to 5 carbon atoms.

In some embodiments, $R^1$, $R^2$, $R^3$, $R^4$, and $R^5$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

In some embodiments, the organic group is substituted with one or more halide, hydroxyl, acyloxyl or acyl group.

The term "alkyl group" means a group formed by removing a hydrogen from a carbon of an alkane, where an alkane is an acyclic or cyclic compound consisting entirely of hydrogen atoms and saturated carbon atoms. An alkyl group may include one or more substituent groups.

The term "heteroalkyl group" means a group formed by removing a hydrogen from a carbon of a heteroalkane, where a heteroalkane is an acyclic or cyclic compound consisting entirely of hydrogen atoms, saturated carbon atoms, and one or more heteroatoms. A heteroalkyl group may include one or more substituent groups.

The term "alkenyl group" means a group formed by removing a hydrogen from a carbon of an alkene, where an alkene is an acyclic or cyclic compound consisting entirely of hydrogen atoms and carbon atoms, and including at least one carbon-carbon double bond. An alkenyl group may include one or more substituent groups.

The term "heteroalkenyl group" means a group formed by removing a hydrogen from a carbon of a heteroalkene, where a heteroalkene is an acyclic or cyclic compound consisting entirely of hydrogen atoms, carbon atoms and one or more heteroatoms, and including at least one carbon-carbon double bond. A heteroalkenyl group may include one or more substituent groups.

The term "alkynyl group" means a group formed by removing a hydrogen from a carbon of an alkyne, where an alkyne is an acyclic or cyclic compound consisting entirely of hydrogen atoms and carbon atoms, and including at least one carbon-carbon triple bond. An alkynyl group may include one or more substituent groups.

The term "heteroalkynyl group" means a group formed by removing a hydrogen from a carbon of a heteroalkyne, where a heteroalkyne is an acyclic or cyclic compound consisting entirely of hydrogen atoms, carbon atoms and one or more heteroatoms, and including at least one carbon-carbon triple bond. A heteroalkynyl group may include one or more substituent groups.

The term "aryl group" means a group formed by removing a hydrogen from a ring carbon atom of an aromatic hydrocarbon. An aryl group may be monocyclic or polycyclic and may include one or more substituent groups.

The term "heteroaryl group" means a group formed by replacing one or more methine (—C=) and/or vinylene (—CH=CH—) groups in an aryl group with a trivalent or divalent heteroatom, respectively.

A heteroaryl group may be monocyclic or polycyclic and may include one or more substituent groups.

The term "substituent group" means a group that replaces one or more hydrogen atoms in a molecular entity.

The term "heterocyclic group" means a group formed by removing a hydrogen from a cyclic compound that has atoms of at least two different elements as members of its ring(s).

The term "acyl group" means a group formed by removing one or more hydroxyl groups from an oxoacid, i.e. RCO—.

The term "halogen group" means F—, Cl—, Br— or I—.

The term "hydroxyl group" means the group containing an oxygen atom connected by a covalent bond to a hydrogen atom, i.e. OH—.

The term "alkoxy group" means an alkyl group singularly bonded to oxygen, i.e. R—O.

The term "acyloxyl group" means a group formed by removal of hydrogen from oxygen in an organic acid, e.g. RCOO—.

The term "organohalide" means an organic compound that includes at least one halogen group.

In some embodiments, $R^1$, $R^2$, $R^3$, $R^4$ are H and $R^5$ is $CH_3$.

In some embodiments, $R^1$, $R^2$, $R^3$, $R^4$ are H and $R^5$ is a long chain organic compound.

The term "long chain organic compound" means a linked chain of 5 to 20 carbon atoms.

In another aspect, there is provided a process for preparing the compound of Formula (1) comprising oxidizing the compound of Formula (2):

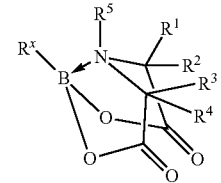

wherein $R^1$, $R^2$, $R^3$, $R^4$, $R^5$, and $R^x$ are each independently H or an organic group.

In some embodiments, $R^x$ is alkyne, alkene, or an aromatic hydrocarbon.

The term "alkyne" means an unsaturated hydrocarbons containing a carbon-carbon triple bond.

The term "alkene" means an unsaturated hydrocarbon that contains at least one carbon-carbon double bond.

The term "aromatic hydrocarbon" means a hydrocarbon with sigma bonds and delocalized pi electrons between carbon atoms forming a circle.

In some embodiments, $R^1$, $R^2$, $R^3$, and $R^4$ are H, $R^5$ is $CH_3$, and $R^x$ is alkyne.

In some embodiments, oxidizing the compound of Formula (2) is performed with at least one conditions and/or reagents selected from $RuCl_3 \cdot 3H_2O$, $H_5IO_6$, MeCN, and 23° C.

In another aspect, there is provided a compound of Formula (3):

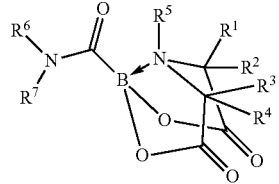

wherein $R^1$, $R^2$, $R^3$, $R^4$, $R^5$, and $R^6$, and $R^7$ are each independently H or an organic group.

In some embodiments of the compound of Formula (3), $R^1$, $R^2$, $R^3$, $R^4$, $R^5$, $R^6$, and $R^7$ are each independently H or an organic group. The organic group may be substituted with one or more halide, hydroxyl, acyloxyl or acyl group.

In some embodiments of the compound of Formula (3), $R^1$, $R^2$, $R^3$, $R^4$, $R^7$ are H, $R^5$ is $CH_3$, and $R^6$ is H or an organic group.

In some embodiments of the compound of Formula (3), $R^6$ is:

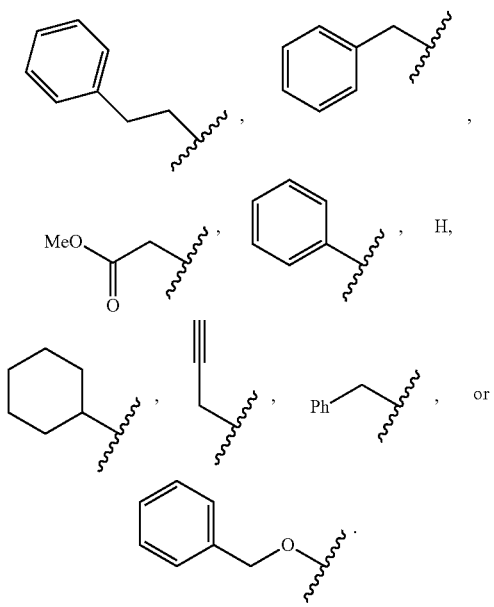

In some embodiments, the compound of Formula (3) is:

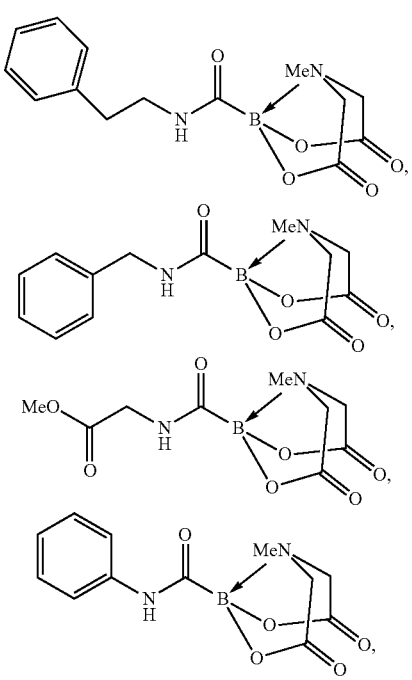

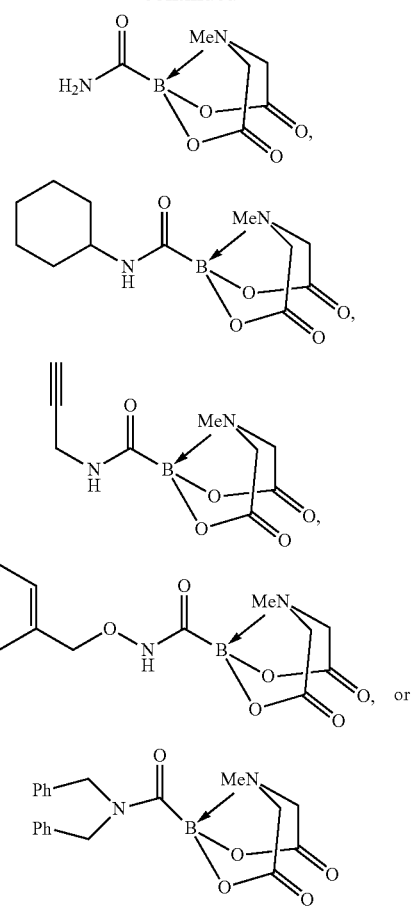

In another aspect, there is provided a process of preparing the compound of Formula (3) comprising reacting the compound of Formula (4)

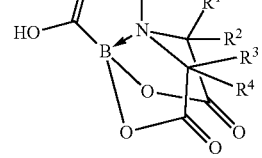

Formula (4)

wherein $R^1$, $R^2$, $R^3$, $R^4$, and $R^5$ and are each independently H or an organic group; with $HNR^6R^7$, wherein $R^6$ and $R^7$ are each independently H or an organic group.

In some embodiments of the process of preparing the compound of Formula (3) comprising reacting the compound of Formula (4) with $HNR^6R^7$, $R^1$, $R^2$, $R^3$, and $R^4$ are H, $R^5$ is $CH_3$, $R^6$ and $R^7$ are each independently H or an organic group.

In some embodiments, reacting the compound of Formula (4) with $H_2NR^6R^7$ is performed with at least one conditions and/or reagents selected from 1-[Bis(dimethylamino)methylene]-1H-1,2,3-triazolo[4,5-b]pyridinium 3-oxide hexafluorophosphate (HATU), N,N-Diisopropylethylamine (DIPEA), and MeCN, 0° C.

In another aspect, there is provided a compound of Formula (5):

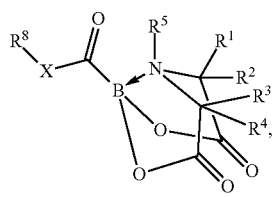

Formula (5)

wherein $R^1$, $R^2$, $R^3$, $R^4$, $R^5$, and $R^8$ are each independently H or an organic group; and X is O or S.

In some embodiments of the compound of Formula (5), $R^1$, $R^2$, $R^3$, $R^4$, $R^5$, and $R^8$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

In some embodiments of the compound of Formula (5), the organic group is substituted with one or more halide, hydroxyl, acyloxyl or acyl group.

In some embodiments of the compound of Formula (5), $R^1$, $R^2$, $R^3$, $R^4$ are H and $R^5$ is $CH_3$.

In some embodiments of the compound of Formula (5), $R^8$ is

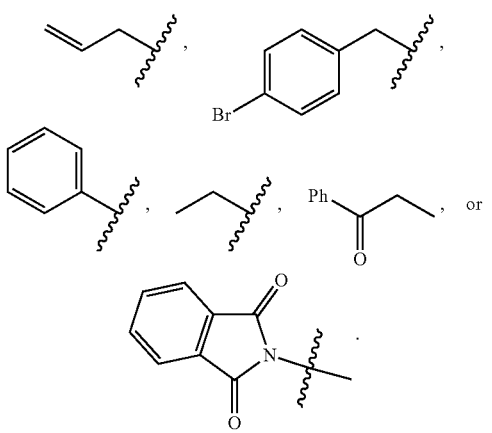

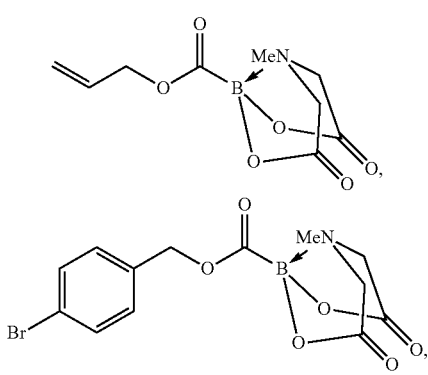

In some embodiments, the compound of Formula (5) is:

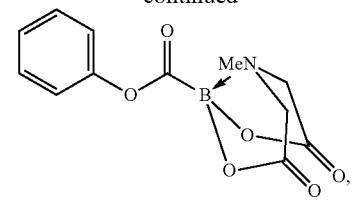

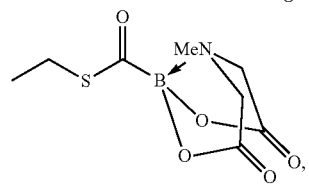

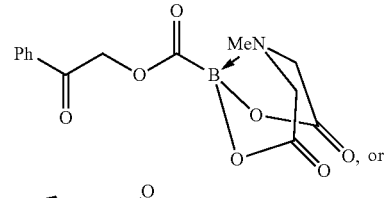

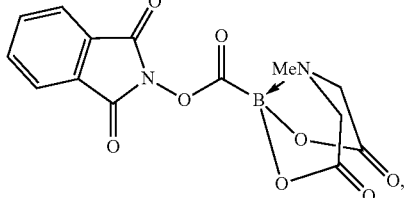

In another aspect, there is provided a process for preparing the compound of Formula (5) comprising reacting the compound of Formula (6):

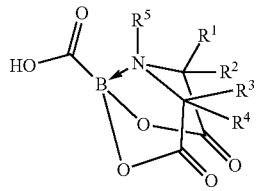

Formula (6)

wherein $R^1$, $R^2$, $R^3$, $R^4$, and $R^5$ and are each independently H or an organic group; with X—$R^8$, wherein $R^8$ is H or an organic group, and X is O or S.

In some embodiments of the process of preparing the compound of Formula (5) comprising reacting the compound of Formula (6) with X—$R^8$, $R^1$, $R^2$, $R^3$, and $R^4$ are H, $R^5$ is $CH_3$, $R^8$ is H or an organic group, and X is O or S.

In some embodiments, reacting the compound of Formula (6) is performed with at least one conditions and/or reagents selected from $Na_2CO_3$, Dimethyl sulfoxide (DMSO), and temperature of 0° C. to 25° C.

In another aspect, there is provided a process for preparing the compound of Formula (5) comprising reacting the compound of Formula (6), wherein $R^1$, $R^2$, $R^3$, $R^4$, and $R^5$ and are each independently H or an organic group; with Y—$R^9$, wherein $R^9$ is H or an organic group, and Y is a halogen, preferably Br, and X is O.

In some embodiments of the process of preparing the compound of Formula (5) comprising reacting the compound of Formula (6) with Y—$R^9$, $R^1$, $R^2$, $R^3$, and $R^4$ are H, $R^5$ is $CH_3$, and $R^9$ is H or an organic group, and Y is a halogen, preferably Br, and X is O.

In some embodiments, reacting the compound of Formula (6) is performed with at least one conditions and/or reagents selected from Na$_2$CO$_3$, Dimethyl sulfoxide (DMSO), and temperature of 0° C. to 25° C.

In another aspect, there is provided a compound of Formula (7):

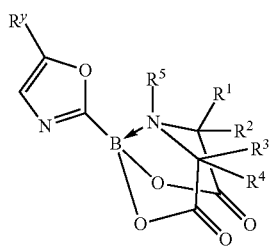

Formula (7)

wherein R$^1$, R$^2$, R$^3$, R$^4$, R$^5$, and R$^y$ are each independently H or an organic group.

In some embodiments of the compound of Formula (7), R$^1$, R$^2$, R$^3$, R$^4$, R$^5$, and R$^y$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

In some embodiments of the compound of Formula (7), the organic group is substituted with one or more halide, hydroxyl, acyloxyl or acyl group.

In some embodiments of the compound of Formula (7), R$^1$, R$^2$, R$^3$, R$^4$ are H, R$^5$ is CH$_3$, and R$^y$ is H or an organic group.

In another aspect, there is provided a process for preparing the compound of Formula (7) comprising oxidizing the compound of Formula (8):

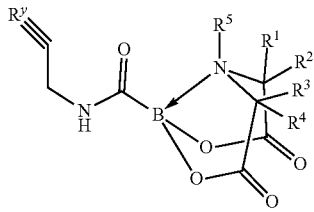

Formula (8)

wherein R$^1$, R$^2$, R$^3$, R$^4$, R$^5$, and R$^y$ are each independently H or an organic group.

In some embodiments of the process for preparing the compound of Formula (7), R$^1$, R$^2$, R$^3$, and R$^4$ are H, R$^5$ is CH$_3$, and R$^y$ is H or an organic group.

In some embodiments of the process for preparing the compound of Formula (7), reacting the compound of Formula (8) is performed with at least one conditions and/or reagents selected from AuCl$_3$ (5 mol %), MeCN, and temperature of 45° C., 2 hours.

In another aspect, there is provided a compound of Formula (9):

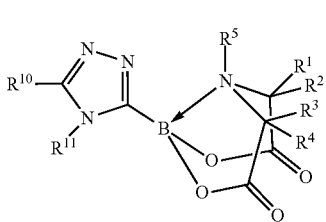

Formula (9)

wherein R$^1$, R$^2$, R$^3$, R$^4$, R$^5$, R$^{10}$, and R$^{11}$ are each independently H or an organic group.

In some embodiments of the compound of Formula (9), R$^1$, R$^2$, R$^3$, R$^4$, R$^5$, R$^{10}$, and R$^{11}$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

In some embodiments of the compound of Formula (9), the organic group is substituted with one or more halide, hydroxyl, acyloxyl or acyl group.

In some embodiments of the compound of Formula (9), R$^1$, R$^2$, R$^3$, R$^4$ are H, R$^5$ is CH$_3$, and R$^{10}$, and R$^{11}$ are each independently a phenyl group.

The term "phenyl group" means a cyclic group of atoms with the formula C$_6$H$_5$.

In another aspect, there is provided a process for preparing the compound of Formula (9) comprising reacting the compound of Formula (10):

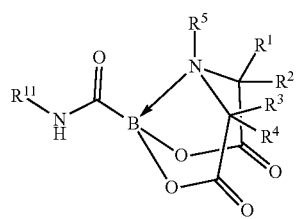

Formula (10)

with the compound of Formula (11):

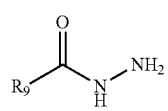

Formula (11)

wherein R$^1$, R$^2$, R$^3$, R$^4$, R$^5$, R$^{10}$, and R$^{11}$ are each independently H or an organic group.

In some embodiments of the process for preparing the compound of Formula (9) comprising reacting the compound of Formula (10), R$^1$, R$^2$, R$^3$, and R$^4$ are H, R$^5$ is CH$_3$, and R$^{10}$, R$^{11}$ are each independently a phenyl group.

In some embodiments of the process for preparing the compound of Formula (9) comprising reacting the compound of Formula (10), reacting the compound of Formula (10) is performed with at least one conditions and/or reagents selected from Trifluoromethanesulfonic anhydride (Tf₂O), 2-chloropyridine (2-ClPyr), 1,2-Dichloroethene (DCE), temperature of 90° C., 2 hours.

The advantages of the present invention are further illustrated by the following examples. The examples and their particular details set forth herein are presented for illustration only and should not be construed as a limitation on the claims of the present invention.

Examples

Carboxy-MIDA-boronate may be accessed in one step through the operationally straightforward RuO₄-mediated oxidative cleavage of commercially available ethynyl MIDA boronate. The Carboxy-MIDA-boronate is stable under a variety of conditions, not only providing access into borylated amides and esters, but also enabling the condensation driven construction of various heterocyclic scaffolds.

Scheme 1. Preparation of Carboxy-MIDA-boronate

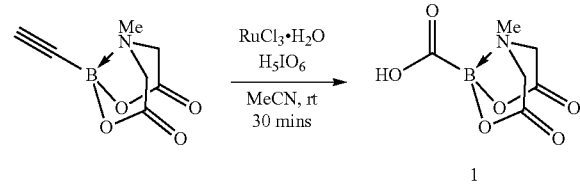

1

Reference is made to Scheme 1, Supra. General procedure for the synthesis of Carboxy-MIDA-boronate 1: Ethynyl MIDA boronate (1.0 eq) and periodic acid (4.0 eq) were combined in MeCN (0.2 M). RuCl₃—H₂O (8.5 mol %) was added and the resulting solution was left to stir at room temperature. After 30 minutes, or as indicated by TLC, the reaction mixture was diluted with EtOAc and filtered through a plug of celite. The celite was washed with 10% AcOH in EtOAc. IRA743 free base resin was added to the filtrate, and the resulting mixture was stirred for 15 minutes. The solution was then filtered through a short plug of celite and concentrated. The resulting solid was dissolved in Ace and Et₂O was added to precipitate the product. Carboxy-MIDA-boronate was isolated as a white solid in 62% yield.

Carboxy-MIDA-boronate (1)

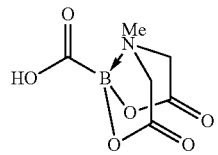

Carboxy-MIDA-boronate 1 was isolated as a white solid; 62% yield; mp 164-168° C.; $R_f$=0.13 (3:1 Ace/Hex); IR (solid): 3183, 1752, 1703, 1294, 1064, 1053, 1029, 899, 817 cm$^{-1}$; $^1$H NMR (400 MHz, MeCN-d₃) δ 9.07 (s, 1H), 4.08, 3.94 (ABq, J=17.0 Hz, 4H), 2.96 (s, 3H). $^{11}$B NMR (128 MHz, MeCN-d₃) δ 5.4; $^{13}$C NMR (126 MHz, DMSO-d₆) δ 168.9, 61.9, 46.9; HRMS [ESI-MS](M+Na)⁺ m/z calculated for C₆H₈BNNaO₆=223.0373; m/z found=223.0377.

Scheme 2. GC-TCD Headspace Experiment

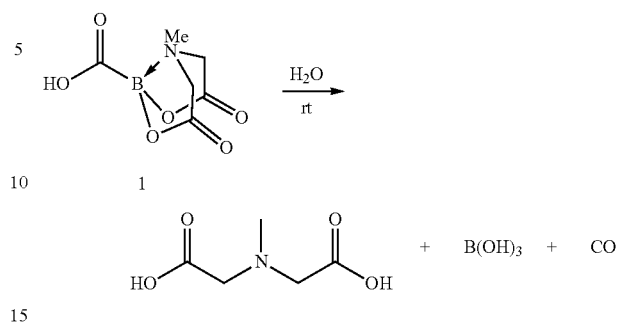

Reference is made to Scheme 2, Supra. a microwave vile under nitrogen was charged with carboxy-MIDA-boronate 1 (100 mg, 1.0 eq.) and was immediately sealed. The system was purged under a nitrogen atmosphere. Following, H₂O (0.20 mL, 2.5 M) was added and bubbling was immediately observed. The mixture was left to sit until all of the material had dissolved into the solution. An airtight syringe was used to sample the headspace inside the vile. The extracted gas was injected into a GC. The resulting chromatogram, shown in FIG. 1, demonstrated that CO was generated (retention time=8.2 min).

Scheme 3. Preparation of carbamoyl-MIDA-boronates

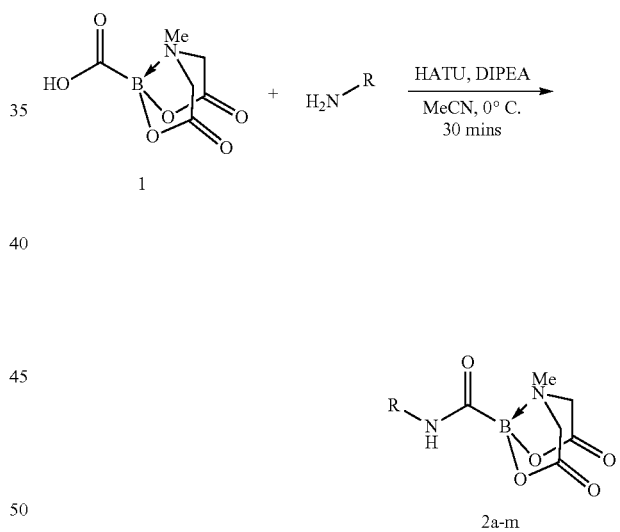

Reference is made to Scheme 3, Supra. General procedure for the synthesis of carbamoyl-MIDA-boronates 2a-i: Carboxy-MIDA-boronate (1.0 eq) and HATU (1.2 eq) in MeCN (0.1 M) were added to a flame-dried round bottom flask equipped with a magnetic stir, rubber septum and under nitrogen atmosphere. The solution was cooled to 0° C. DIPEA (2.0 eq) was subsequently added and the resulting mixture was stirred for 5 minutes. The corresponding amine (1.2 eq) was added and the reaction was stirred until completion, as indicated by TLC (~20 minutes). Upon completion, the reaction mixture was loaded onto Celite and concentrated in vacuo. Normal phase column chromatography was performed to afford the corresponding carbamoyl-MIDA-boronates as white solids.

MIDA (phenethylcarbmoyl)boronate (2a)

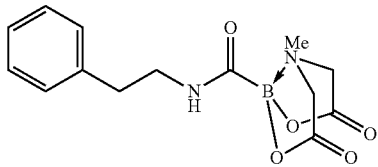

MIDA (phenethylcarbmoyl)boronate (2a) was isolated as a white solid; 62% yield; Off-white solid; $R_f$=0.30 (3:2 Ace/Hex); $^1$H NMR (500 MHz, MeCN-$d_3$) δ 7.15-7.36 (m, 5H), 6.90 (s, 1H), 4.01 (d, J=16.9 Hz, 2H), 3.87 (d, J=16.9 Hz, 2H), 3.47 (m, 2H), 2.78 (t, J=7.2 Hz, 2H), 2.73 (s, 3H); $^{11}$B NMR (128 MHz, MeCN-$d_3$) δ 5.6; $^{13}$C NMR (126 MHz, MeCN-$d_3$) δ 169.0, 140.7, 129.8, 129.3, 127.1, 62.7, 47.2, 39.4, 36.4; HRMS (DART-TOF) [M+H$^+$] m/z calculated for $C_{14}H_{18}BN_2O_6$=305.1309; m/z found=305.1309.

MIDA (benzylcarbamoyl)boronate (2b)

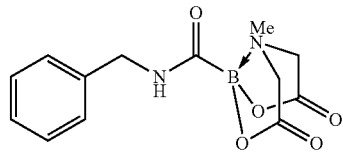

MIDA (benzylcarbamoyl)boronate (2b) was isolated as a white solid; 42% yield; $R_f$=0.32 (3:1 Ace/Hex); $^1$H NMR (400 MHz, MeCN-$d_3$) δ 7.36-7.23 (m, 5H), 4.41 (d, J=6.3 Hz, 2H), 4.04 (d, J=16.9 Hz, 2H), 3.92 (d, J=16.9 Hz, 2H), 2.89 (s, 3H). $^{11}$B NMR (128 MHz, MeCN-$d_3$) δ 5.7; $^{13}$C NMR (101 MHz, MeCN-$d_3$) δ 169.0, 140.7, 129.4, 128.4, 127.8, 62.9, 47.5, 41.9; HRMS (DART-TOF) [M+H$^+$] m/z calculated for $C_{13}H1BN_2O_5$=291.11523; m/z found=291.1163.

MIDA ((2-methoxy-2-oxoethyl)carbamoyl)boronate (2c)

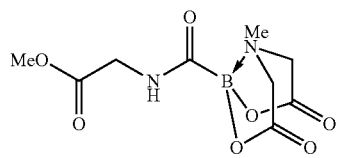

MIDA ((2-methoxy-2-oxoethyl)carbamoyl)boronate (2c) was isolated as a white solid; 51% yield; $R_f$=0.20 (3:1 Ace/Hex); $^1$H NMR (400 MHz, DMSO-$d_6$) δ 8.33 (t, J=5.9 Hz, 1H), 4.33 (d, J=17.1 Hz, 2H), 4.04 (d, J=17.1 Hz, 2H), 3.83 (d, J=5.9 Hz, 2H), 3.60 (s, 3H), 2.85 (s, 3H); $^{11}$B NMR (128 MHz, DMSO-$d_6$) δ 5.6; $^{13}$C NMR (126 MHz, DMSO-$d_6$) δ 170.3, 168.9, 61.7, 51.6, 46.7, 39.3; HRMS (DART-TOF) [M+H$^+$] m/z calculated for $C_9H_{14}B_1N_2O_7$=273.0894; m/z found=273.0894.

MIDA (phenylcarbamoyl)boronate (2d)

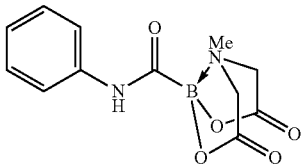

MIDA (phenylcarbamoyl)boronate (2d) was isolated as white solid; 50% yield; $R_f$=0.30 (3:1 Ace/Hex); $^1$H NMR (300 MHz, MeCN-$d_3$) δ 8.49 (s, 1H), 7.75-7.61 (m, 2H), 7.32 (dd, J=8.4, 7.5 Hz, 2H), 7.17-6.99 (m, 1H), 4.09, 3.98 (ABq, J=16.9 Hz, 4H), 2.96 (s, 3H); $^{11}$B NMR (96 MHz, MeCN-$d_3$) δ 5.8; $^{13}$C NMR (126 MHz, MeCN-$d_3$) δ 169.0, 139.2, 129.6, 125.1, 121.4, 63.0, 47.7; HRMS (DART-TOF) [M+H$^+$] m/z calculated for $C_{12}H_{14}B_{11}N_2O_5$=277.0996; m/z found=277.0987.

MIDA ((4-methoxyphenyl)carbamoyl)boronate (2e)

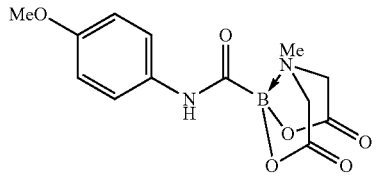

MIDA ((4-methoxyphenyl)carbamoyl)boronate (2e) was isolated as a white solid; 74% yield; $R_f$=0.3 (1:1 Hex:Ace); $^1$H NMR (500 MHz, MeCN-$d_3$) δ 8.45 (s, 1H), 7.62-7.49 (m, 2H), 6.87 (d, J=9.0 Hz, 2H), 4.09, 3.97 (ABq, J=17.0 Hz, 4H), 3.75 (s, 3H), 2.96 (s, 3H); $^{11}$B NMR (128 MHz, MeCN-$d_3$) δ 5.7; $^{13}$C NMR (126 MHz, MeCN-$d_3$) δ 169.2, 157.3, 132.2, 123.2, 114.7, 63.0, 56.0, 47.6; HRMS (ESI+) [M+H$^+$] m/z calculated for $C_{13}H_{18}BN_2O_6$=306.1132; m/z found=306.1129.

MIDA ((2-((tert-butoxycarbonyl)amino)phenyl)carbamoyl)boronate (2f)

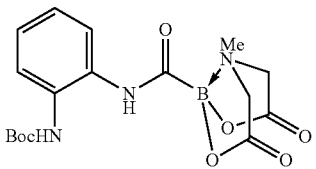

MIDA ((2-((tert-butoxycarbonyl)amino)phenyl)carbamoyl)boronate (2f) was isolated as a grey solid; 85% yield; $R_f$=0.32 (1:1 Hex:Ace); $^1$H NMR (400 MHz, MeCN-$d_3$) δ 8.78 (s, 1H), 7.50 (dd, J=8.0, 1.5 Hz, 1H), 7.45 (dd, J=7.9, 1.7 Hz, 1H), 7.22 (td, J=7.7, 1.6 Hz, 1H), 7.14 (td, J=7.6, 1.6 Hz, 1H), 4.11, 4.00 (ABq, J=17.0 Hz, 4H), 3.01 (s, 3H), 1.47 (s, 9H); $^{11}$B NMR (128 MHz, MeCN-$d_3$) δ 5.7; $^{13}$C NMR (101 MHz, CD3CN) δ 168.9, 127.2, 126.3, 125.7, 80.9, 63.1, 47.9, 28.5; HRMS (ESI+) [M+Na$^+$] m/z calculated for $C_{17}H_{22}BN_3NaO_7$=413.1479; m/z found=413.1486.

MIDA ((4-chlorophenyl)carbamoyl)boronate (2g)

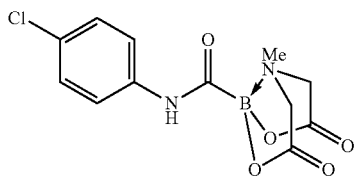

MIDA ((4-chlorophenyl)carbamoyl)boronate (2g) was isolated as a white solid; 80% yield; $R_f$=0.4 (1:1 Hex:Ace); $^1$H NMR (500 MHz, MeCN-$d_3$) δ 8.61 (s, 1H), 7.79-7.56 (m, 2H), 7.38-7.22 (m, 2H), 4.09, 3.98 (ABq, J=17.0 Hz, 4H), 2.95 (s, 3H); $^{11}$B NMR (128 MHz, MeCN-$d_3$) δ 5.5; $^{13}$C NMR (126 MHz, MeCN-$d_3$) δ 169.0, 138.0, 129.5, 129.3, 122.9, 63.0, 47.7; HRMS (ESI+) [M+H$^+$]m/z calculated for $C_{12}H_{13}BClN_2O_5$=310.0637; m/z found=310.0628.

MIDA Carbamoylboronate (2h)

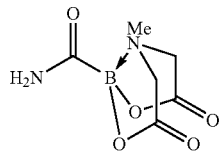

MIDA carbamoylboronate (2h) was isolated as a white solid; 32% yield; $R_f$=0.1 (3:1 Ace/Hex); $^1$H NMR (400 MHz, MeCN-$d_3$) δ 6.74 (s, 1H), 6.59 (s, 1H), 3.73 (d, J=17.0 Hz, 2H), 3.46 (d, J=17.0 Hz, 2H), 2.31 (s, 3H); $^{11}$B NMR (128 MHz, DMSO-$d_6$) δ 5.6; $^{13}$C NMR (101 MHz, DMSO-$d_6$) b 168.9, 61.7, 46.4; HRMS (DART-TOF) [M+H$^+$] m/z calculated for $C_6H_{10}BN_2O_5$=201.0683; m/z found=201.0680.

MIDA (cyclohexylcarbamoyl)boronate (2i)

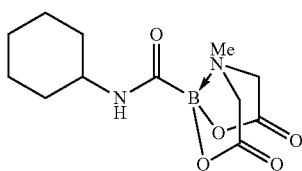

MIDA (cyclohexylcarbamoyl)boronate (2i) was isolated as a white solid; 60% yield; $R_f$=0.3 (3:1 Ace/Hex); $^1$H NMR (500 MHz, MeCN-$d_3$) δ 6.65 (s, 1H), 4.02, 3.90 (ABq, J=16.9 Hz, 4H), 3.81 (tdt, J=10.8, 8.1, 3.9 Hz, 1H), 2.87 (s, 3H), 1.82-1.76 (m, 2H), 1.75-1.66 (m, 2H), 1.63-1.55 (m, 1H), 1.40-1.07 (m, 6H); $^{11}$B NMR (128 MHz, MeCN-$d_3$) δ 5.6; $^{13}$C NMR (126 MHz, MeCN-$d_3$) δ 286.0, 179.7, 164.4, 164.3, 150.6, 143.3, 142.8; HRMS (DART-TOF) [M+H$^+$] m/z calculated for $C_{12}H_{20}B_1N_2O_5$=283.1465; m/z found=283.1459.

MIDA (prop-2-yn-1-ylcarbamoyl)boronate (2j)

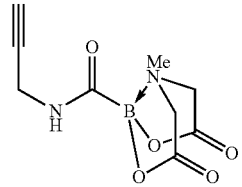

MIDA (prop-2-yn-1-ylcarbamoyl)boronate (2j) was isolated as an off-white solid; 73% yield; $R_f$=0.25 (3:1 Ace/Hex); $^1$H NMR (500 MHz, MeCN-$d_3$) δ 7.18 (s, 1H), 4.04 (dd, J=16.9, 1.5 Hz, 2H), 3.97 (dd, J=5.9, 2.6 Hz, 2H), 3.92 (dd, J=17.0, 1.3 Hz, 2H), 2.88 (s, 3H), 2.38 (t, J=2.5 Hz, 1H); $^{11}$B NMR (128 MHz, MeCN-$d_3$) δ 5.6; $^{13}$C NMR (126 MHz, MeCN-$d_3$) δ 285.9, 198.6, 188.1, 179.8, 164.4, 144.2; HRMS (DART-TOF) [M+H$^+$] m/z calculated for $C_9H_{12}BN_2O_5$=239.0839; m/z found=239.0833.

MIDA (dibenzylcarbamoyl)boronate (2k)

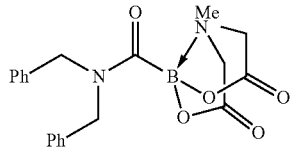

MIDA (dibenzylcarbamoyl)boronate (2k) was isolated as a white solid; 30% yield; $R_f$=0.3 (1:1 Ace/Hex); $^1$H NMR (400 MHz, DMSO-$d_6$) δ $^1$H NMR (500 MHz, MeCN-$d_3$) δ 7.41-7.36 (m, 2H), 7.34-7.28 (m, 3H), 7.28-7.22 (m, 3H), 7.20-7.14 (m, 2H), 4.74 (s, 2H), 4.46 (s, 2H), 4.06, 4.03 (ABq, $J_{AB}$=16.7 Hz, 4H), 3.07 (s, 3H); $^{11}$B NMR (128 MHz, MeCN-$d_3$) δ 6.3; $^{13}$C NMR (126 MHz, MeCN-$d_3$) δ 285.9, 255.8, 255.6, 246.6, 246.4, 245.7, 245.3, 245.3, 244.9, 179.8, 167.6, 164.1, 163.6; HRMS (DART-TOF) [M+H$^+$] m/z calculated for $C20H22BN_2O_5$=381.1622; m/z found=381.1623.

MIDA (morpholine-4-carbonyl)boronate (2l)

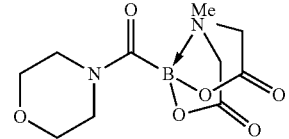

MIDA (morpholine-4-carbonyl)boronate (2l) was isolated as a white solid; 74% yield; $R_f$=0.24 (3:1 Hex:Ace); $^1$H NMR (500 MHz, DMSO-$d_6$) δ 4.30 (d, J=16.9 Hz, 2H), 4.03 (d, J=16.8 Hz, 2H), 3.71 (m, 2H), 3.60-3.56 (m, 2H), 3.56-3.51 (m, 2H), 3.48 (m, 2H), 2.96 (s, 3H); $^{11}$B NMR (128 MHz, MeCN-$d_3$) δ 6.0; $^{13}$C NMR (126 MHz, DMSO-$d_6$) δ 168.6, 67.0, 66.4, 61.6, 46.0, 45.5, 39.9; HRMS (DART-TOF) [M+H$^+$] m/z calculated for $C_{10}H_{16}BN_2O_6$=271.1101; m/z found=271.1106.

MIDA ((benzyloxy)carbamoyl)boronate (2m)

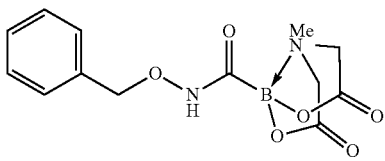

MIDA ((benzyloxy)carbamoyl)boronate (2m) was isolated as a white solid; 50%; $R_f$=0.2 (1:1 Ace/Hex); $^1$H NMR (400 MHz, MeCN-$d_3$) δ 9.45 (s, 1H), 7.50-7.29 (m, 5H), 4.87 (s, 2H), 4.03 (d, J=17.0 Hz, 2H), 3.89 (d, J=17.0 Hz, 2H), 2.84 (s, 3H); $^{11}$B NMR (128 MHz, MeCN-$d_3$) δ 5.4; LRMS (ESI+) [M+H$^+$] for $C_{13}H_{15}BN_2O_6$ found=307.10.

Scheme 4. Preparation of ester-MIDA-boronates

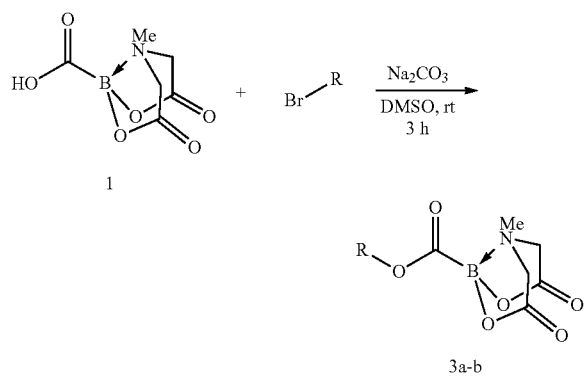

Reference is made to Scheme 4, Supra. General procedure for the synthesis of ester-MIDA-boronates 3a-b: Carboxy-MIDA-boronate 1 (1.0 eq) and Na$_2$CO$_3$ (3.0 eq) in DMSO (0.1 M) was added to a 2 dram vial equipped with a magnetic stir bar. The resulting solution was stirred at room temperature for 15 minutes, after which the corresponding alkyl bromide (3.0 eq) was added. The reaction was stirred until completion as indicated by TLC (~3 hours). Upon completion, the reaction was diluted with EtOAc and brine. The layers were separated and the aqueous layer was extracted with EtOAc (3×). The organic fractions were combined, loaded onto Celite and concentrated in vacuo. Normal phase column chromatography was performed. The resulting solid was then dissolved in acetone and precipitated using Et$_2$O to provide products as white solids.

MIDA ((allyloxy)carboxyl)boronate (3a)

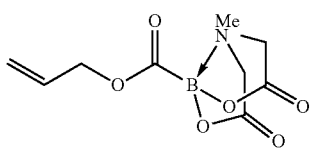

MIDA ((allyloxy)carboxyl)boronate (3a) was isolated as a white solid; 40% yield; $R_f$=0.34 (1:1 Ace/Hex); $^1$H NMR (400 MHz, MeCN-$d_3$) δ 5.97 (ddt, J=17.2, 10.4, 5.7 Hz, 1H), 5.43-5.05 (m, 2H), 4.60 (m, 2H), 4.09 (d, J=17.0 Hz, 2H), 3.94 (d, J=17.0 Hz, 2H), 2.93 (s, 4H); $^{11}$B NMR (128 MHz, MeCN-$d_3$) δ 5.5; $^{13}$C NMR (126 MHz, MeCN-$d_3$) δ 167.7, 133.0, 133.0, 62.6, 61.9, 46.9; HRMS (DARTTOF) [H+NH$_4$$^+$] m/z calculated for $C_9H_{16}BN_2O_6$=259.1101; m/z found=259.1106.

MIDA (((4-bromobenzyl)oxy)carbonyl)boronate (3b)

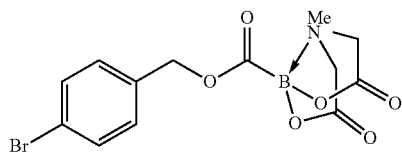

MIDA (((4-bromobenzyl)oxy)carbonyl)boronate (3b) was isolated as a white solid; $R_f$=0.32 (1:1 Hex/Ace); $^1$H NMR (400 MHz, MeCN-$d_3$) δ 7.60-7.47 (m, 2H), 7.37-7.20 (m, 2H), 5.10 (s, 2H), 4.08 (d, J=17.0 Hz, 2H), 3.93 (d, J=16.9 Hz, 2H), 2.89 (s, 3H). $^{11}$B NMR (128 MHz, MeCN-$d_3$) δ 5.6; LRMS (ESI+) [M+NH$_4$$^+$] for $C_{13}H_{14}BBrNO_6$ found=369.0.

Scheme 5. Preparation of ester-MIDA-boronates and thionoester-MIDA-boronates

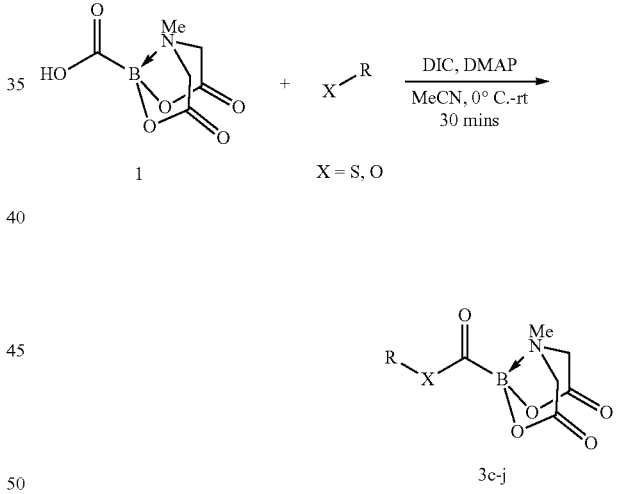

Reference is made to Scheme 5, Supra. General procedure for the synthesis of ester-MIDA-boronates and thionoester-MIDA-boronates 3c-f. Carboxy-MIDA-boronate 1 (1.0 eq) in MeCN (0.2 M) was added to a 2 dram vial equipped with a magnetic stir bar. The reaction mixture was cooled to 0° C. and subsequently charged with DMAP (10 mol %) and DIC (2.0 eq). The resulting mixture was stirred at 0° C. for 15 minutes, after which a solution of the corresponding alcohol (2.0 eq) in MeCN (0.5 M) was added dropwise. The reaction was stirred at room temperature until completion, as indicated by TLC (~15 mins). Upon completion, the reaction mixture was loaded onto Celite and concentrated in vacuo. Normal phase column chromatography was performed. The resulting solid was then dissolved in acetone and precipitated using Et$_2$O to provide products as white solids.

MIDA (phenoxycarbonyl)boronate (3c)

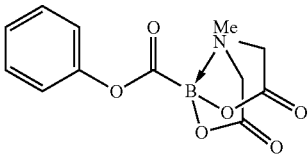

MIDA (phenoxycarbonyl)boronate (3c) was isolated as a white solid; 51% yield; $R_f$=0.47 (3:1 Ace:Hex); $^1$H NMR (500 MHz, MeCN-$d_3$) δ 7.42 (dd, J=8.5, 7.5 Hz, 2H), 7.31-7.23 (m, 1H), 7.15-7.04 (m, 2H), 4.16, 4.05 (ABq, J=17.0 Hz, 4H), 3.10 (s, 3H); $^{11}$B NMR (128 MHz, MeCN-$d_3$) δ 5.6; $^{13}$C NMR (126 MHz, MeCN-$d_3$) δ 168.7, 151.5, 130.4, 126.7, 123.1, 63.1, 48.3; HRMS (DART-TOF) [M+NH$_4^+$] m/z calculated for $C_{12}H_{16}BN_2O_6$=295.1101; m/z found=295.1107.

MIDA ((4-methoxyphenoxy)carbonyl)boronate (3d)

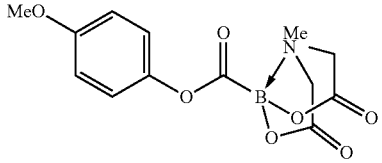

MIDA ((4-methoxyphenoxy)carbonyl)boronate (3d) was isolated as a white solid; 66% yield; $R_f$=0.36 (100% EtOAc); $^1$H NMR (500 MHz, MeCN-$d_3$) δ 7.02-6.98 (m, 2H), 6.96-6.91 (m, 2H), 4.15, 4.04 (ABq, J=17.0 Hz, 4H), 3.78 (s, 3H), 3.08 (s, 3H); $^{11}$B NMR (128 MHz, MeCN-$d_3$) δ 5.7; $^{13}$C NMR (126 MHz, MeCN-$d_3$) δ 168.7, 158.3, 144.7, 123.8, 115.3, 63.1, 56.2, 48.2; HRMS (DART-TOF) [M+NH$_4^+$] m/z calculated for $C_{13}H_{18}BN_2O_7$=325.1215; m/z found=325.1214.

MIDA ((4-bromophenoxy)carbonyl)boronate (3e)

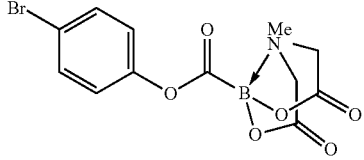

MIDA ((4-bromophenoxy)carbonyl)boronate (3e) was isolated as a white solid; 91 mg, 0.26 mmol, 64% yield; $R_f$=0.46 (100% EtOAc); $^1$H NMR (500 MHz, MeCN-$d_3$) δ 7.56 (d, J=8.9 Hz, 2H), 7.04 (d, J=8.9 Hz, 2H), 4.16, 4.04 (ABq, J=17.1 Hz, 4H), 3.08 (s, 3H); $^{11}$B NMR (128 MHz, MeCN-$d_3$) δ 5.6; $^{13}$C NMR (126 MHz, MeCN-$d_3$) δ 168.6, 150.6, 133.4, 125.2, 119.2, 63.1, 48.3; HRMS (ESI+) [M+NH$_4^+$] m/z calculated for $C_{12}H_{15}BBrN_2O$=372.0237; m/z found=372.0230.

MIDA ((ethylthio)carbonyl)boronate (3f)

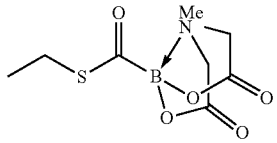

MIDA ((ethylthio)carbonyl)boronate (3f) was isolated as a white solid; 40% yield; $R_f$=0.30 (1:1 Ace:Hex); $^1$H NMR (500 MHz, MeCN-$d_3$) δ 4.09 (d, J=17.1 Hz, 2H), 3.94 (d, J=17.1 Hz, 2H), 2.90 (q, J=7.4 Hz, 2H), 2.85 (s, 3H), 1.19 (t, J=7.4 Hz, 3H); $^{11}$B NMR (128 MHz, MeCN-$d_3$) δ 5.1; $^{13}$C NMR (126 MHz, MeCN-$d_3$) δ 168.6, 63.1, 47.9, 21.4, 15.2; HRMS (DART-TOF) [M+NH$_4^+$] m/z calculated for $C_8H_{16}BN_2O_5S$=263.0873; m/z found=263.0870.

MIDA ((2-cyanoethoxy)carbonyl)boronate (3g)

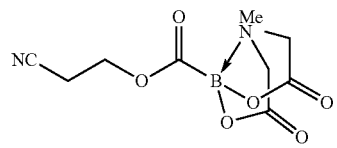

MIDA ((2-cyanoethoxy)carbonyl)boronate (3g) was isolated as a white solid; 51% yield; $R_f$=0.2 (1:1 Hex:Ace); $^1$H NMR (400 MHz, MeCN-$d_3$) δ 4.27 (t, J=6.1 Hz, 2H), 4.11, 3.96 (ABq, J=17.0 Hz, 4H), 2.96 (s, 3H), 2.76 (t, J=6.1 Hz, 2H); $^{11}$B NMR (96 MHz, MeCN-$d_3$) δ 5.4; $^{13}$C NMR (101 MHz, MeCN-$d_3$) δ 168.6, 119.2, 62.9, 57.9, 48.0, 18.7; HRMS (DART-TOF) [M+NH$_4^+$] m/z calculated for $C_9H_{15}BN_3O_6$=272.1054; m/z found=272.1059.

MIDA (((4-methoxyphenyl)thio)carbonyl)boronate (3h)

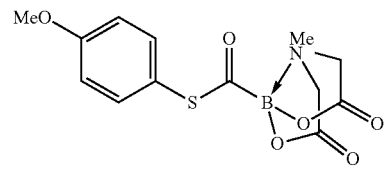

MIDA (((4-methoxyphenyl)thio)carbonyl)boronate (3h) was isolated as a white solid; 61% yield; $R_f$=0.40 (100% EtOAc); $^1$H NMR (500 MHz, DMSO-$d_6$) δ 7.23 (d, J=8.9 Hz, 2H), 7.08-6.95 (m, 2H), 4.44 (d, J=17.2 Hz, 2H), 4.18 (d, J=17.2 Hz, 2H), 3.79 (s, 3H), 2.90 (s, 3H); $^{11}$B NMR (128 MHz, DMSO-$d_6$) δ 5.6; $^{13}$C NMR (126 MHz, DMSO-$d_6$) δ 168.5, 160.0, 135.8, 117.7, 114.9, 62.2, 55.3, 47.2; HRMS (ESI+) [M+H$^+$] m/z calculated for $C_{13}H_{15}BNO_6S$=323.0744; m/z found=323.0742.

MIDA ((2-oxo-2-phenylethoxy)carbonyl)boronate (3i)

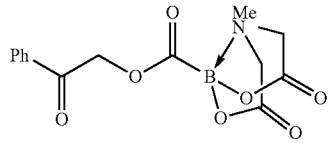

MIDA ((2-oxo-2-phenylethoxy)carbonyl)boronate (3i) was isolated as a white solid; 44% yield; $R_f$=0.3 (1:1 Hex:Ace); $^1$H NMR (400 MHz, MeCN-$d_3$) δ 7.99-7.92 (m, 2H), 7.71-7.62 (m, 1H), 7.59-7.49 (m, 2H), 5.45 (s, 2H), 4.13, 4.00 (ABq, J=17.0 Hz, 4H), 3.12 (s, 3H); $^{11}$B NMR (128 MHz, MeCN-$d_3$) δ 5.6; $^{13}$C NMR (126 MHz, MeCN-$d_3$) δ 194.3, 168.8, 135.3, 134.9, 129.9, 128.7, 65.5, 62.8, 48.0; HRMS (DART-TOF) [M+NH$_4^+$] m/z calculated for $C_{14}H_{18}BN_2O_7$=337.1207; m/z found=337.1204.

MIDA (((1,3-dioxoisoindolin-2-yl)oxy)carbonyl)boronate (3j)

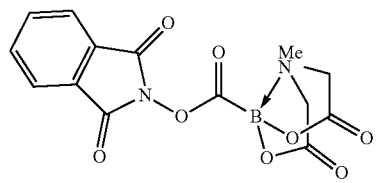

MIDA (((1,3-dioxoisoindolin-2-yl)oxy)carbonyl)boronate (3j) was isolated as an off-white solid; 67% yield; $R_f$=0.6 (1:1 Hex:Ace); $^1$H NMR (500 MHz, MeCN-$d_3$) δ 7.97-7.81 (m, 4H), 4.22, 4.09 (ABq, J=17.2 Hz, 4H), 3.20 (s, 3H); $^{11}$B NMR (128 MHz, MeCN-$d_3$) δ 5.8; $^{13}$C NMR (126 MHz, MeCN-$d_3$) δ 168.2, 163.5, 136.2, 129.8, 124.8, 63.2, 48.8; HRMS (DART-TOF) [M+NH$_4^+$] m/z calculated for $C_{14}H_{15}BN_3O_8$=364.0952; m/z found=364.0960.

Scheme 6. Preparation of borylated oxazole

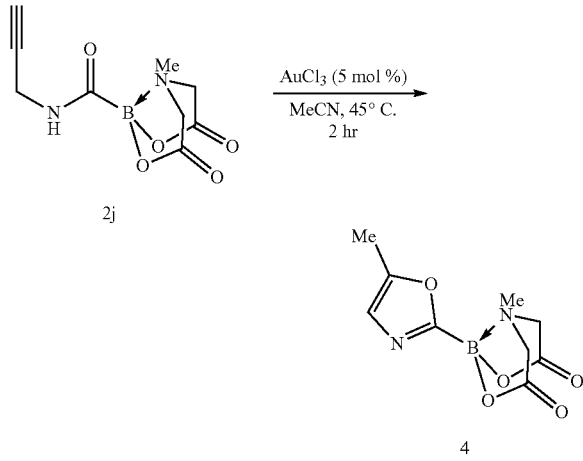

Reference is made to Scheme 6, Supra. General procedure for the synthesis of borylated oxazole 4: Under ambient atmosphere, carboamoyl-MIDA-boronate 2j (1.0 equiv.) was loaded into a 2-dram scintillation vial equipped with a magnetic stir bar. MeCN (3 mL) was added, followed by AuCl$_3$ (0.05 equiv.). The vial was sealed, then the mixture was heated at 45° C. for 2 h, or until the complete consumption of starting material and formation of product as indicated by $^1$H NMR spectroscopy. The mixture was cooled to rt, then filtered through a plug of Celite. The filtrate was loaded onto Celite, then the volatiles were removed in vacuo. The Celite residue was then purified by column chromatography on silica gel eluted with a mixture of acetone in hexanes (50% to 75%) to afford the product as a yellow solid in 88% yield.

MIDA (5-methyloxazol-2-yl)boronate (4)

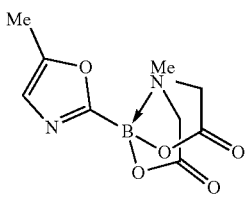

MIDA (5-methyloxazol-2-yl)boronate (4) was isolated as an off-white solid; 88% yield; $R_f$=0.2 (1:1 Ace/Hex); $^1$H NMR (400 MHz, MeCN-$d_3$) δ 6.80 (q, J=1.2 Hz, 1H), 4.12 (d, J=17.0 Hz, 2H), 3.94 (d, J=17.0 Hz, 2H), 2.68 (s, 3H), 2.32 (d, J=1.2 Hz, 3H); $^{11}$B NMR (128 MHz, MeCN-$d_3$) δ 7.5; $^{13}$C NMR (126 MHz, DMSO-$d_6$) δ 168.9, 151.9, 124.1, 62.6, 48.1, 10.9; HRMS (DART-TOF) [M+H$^+$] m/z calculated for $C_9H_{12}B_1N_2O_5$=239.0839; m/z found=239.0835.

Scheme 7. Preparation of borylated 1,2,4-triazole (5)

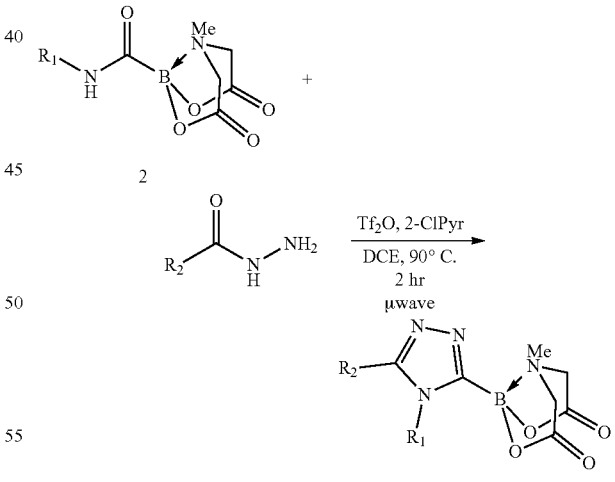

Reference is made to Scheme 7, Supra. General procedure for the synthesis of borylated 1,2,4-triazole 5: amide (1.0 eq.), 2-chloro-pyridine (1.1 eq.) and DCE (0.1 M) was added to a flame dried microwave vile under an argon atmosphere. The resulting mixture was cooled to 0° C. and Tf$_2$O (1.1 eq) was added dropwise over 1 minute. The reaction was stirred at this temperature for 10 minutes, after which hydrazine was added in one portion (1.1 eq). The reaction was then heated to 90° C. using a microwave, and stirred until completion as indicated by TLC and LCMS. Upon completion, the mixture was concentrated and purified by reverse phase column chromatography. The collected fractions containing product were lyophilized. The compound was isolated as a white solid.

MIDA (4,5-diphenyl-4H-1,2,4-triazol-3-yl)boronate (5a)

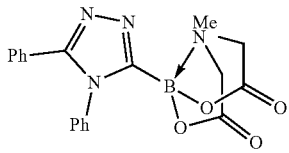

MIDA (4,5-diphenyl-4H-1,2,4-triazol-3-yl)boronate (5a) was isolated as a white solid; $^1$H NMR (500 MHz, MeCN-d$_3$) δ 7.51-7.43 (m, 3H), 7.40-7.26 (m, 8H), 4.04 (d, J=16.9 Hz, 2H), 3.90 (d, J=16.9 Hz, 2H), 2.87 (s, 3H); $^{11}$B NMR (128 MHz, MeCN-d$_3$) δ 8.6; $^{13}$C NMR (126 MHz, MeCN-d$_3$) δ 285.4, 253.9, 247.4, 247.3, 247.1, 246.7, 246.2, 246.0, 245.4, 179.5, 165.2; LRMS (ESI+) [M+H$^+$] for C$_{19}$H$_{18}$BN$_4$O$_4$ found=376.13.

Scheme 8. Preparation of Thiocarbamoyl-MIDA-boronate (6)

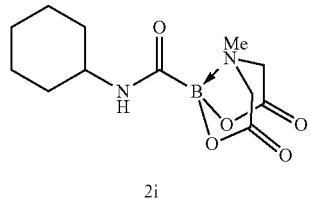

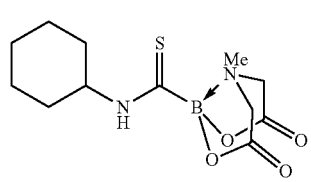

Carbamoyl boronate (2i) (0.15 g, 0.53 mmol, 1.0 eq.) and toluene (15 mL, 0.03 M) were added to a flame-dried 50 mL 2-necked round bottom flask under N$_2$, equipped with a condenser. Lawesson's reagent (0.12 g, 0.29 mmol, 0.55 eq.) was added and the mixture was heated to 90° C. and stirred for 16 hours. Upon completion, as indicated by $^1$H NMR spectroscopy, the mixture was cooled to room temperature and loaded onto Celite. The volatiles were removed in vacuo and the crude product was subjected to column chromatography on silica gel, eluting with a gradient of Ace:Hex (30:70→100:0) to afford 6 as an off-white solid.

MIDA (cyclohexylcarbamothioyl)boronate (6a)

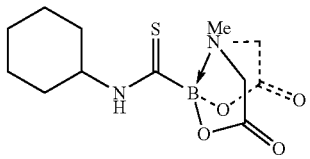

MIDA (cyclohexylcarbamothioyl)boronate (6a) was isolated as an off-white solid; 75% yield; R$_f$=0.6 (1:1 Hex:Ace); $^1$H NMR (500 MHz, DMSO-d$_6$) δ 9.48 (d, J=8.1 Hz, 1H), 4.47 (m, 1H), 4.30 (d, J=17.0 Hz, 2H), 4.00 (d, J=17.0 Hz, 2H), 2.83 (s, 1H), 1.88-1.79 (m, 2H), 1.72 (m, 2H), 1.66-1.56 (m, 1H), 1.39 (m, 2H), 1.26 (m, 2H), 1.14 (tt, J=12.5, 3.4 Hz, 1H); $^{11}$B NMR (128 MHz, DMSO-d$_6$) δ 6.7; $^{13}$C NMR (126 MHz, DMSO-d$_6$) δ 168.8, 62.1, 52.8, 45.7, 30.2, 25.2, 24.7; HRMS (DART-TOF) [M+H$^+$] m/z calculated for C$_{12}$H$_{20}$BN$_2$O$_4$S=299.1237; m/z found=299.1240.

Scheme 9. Preparation of Borylated Triazole (7)

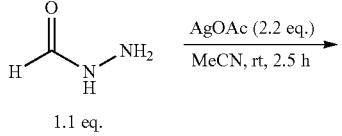

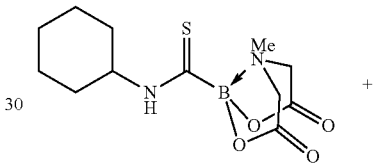

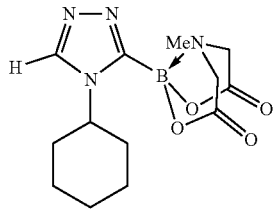

AgOAc (33 mg, 0.200 mmol, 2.2 equiv.) was added to a mixture containing 6 (27 mg, 0.091 mmol, 1.0 equiv.) and formic hydrazide (8 mg, 0.136 mmol, 1.5 equiv.) in MeCN (0.9 mL, 0.1 M). The mixture was stirred at room temperature for 2.5 h. Upon complete consumption of the starting material as indicated by TLC, the mixture was loaded onto Celite, then the volatiles were removed in vacuo. The residue was subjected to column chromatography on silica gel eluted with a mixture of Ace:Hex:AcOH (75:24:1→99:0:1) to afford the product as a colourless solid upon concentration of fractions.

MIDA (4-cyclohexyl-4H-1,2,4-triazol-3-yl)boronate (7a)

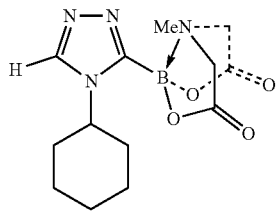

MIDA (4-cyclohexyl-4H-1,2,4-triazol-3-yl)boronate (7a) as a colourless solid; 54% yield; $^1$H NMR (500 MHz, MeCN-d$_3$) δ 8.34 (s, 1H), 4.34 (tt, J=12.0, 3.8 Hz, 1H), 4.14, 4.04 (ABq, J=16.9 Hz, 4H), 2.80 (s, 3H), 2.04 (ddtd, J=12.3, 3.8, 2.3, 1.5 Hz, 2H), 1.91-1.83 (m, 2H), 1.78-1.61 (m, 3H), 1.43 (qt, J=13.2, 3.5 Hz, 2H), 1.32-1.20 (m, 1H); $^{11}$B NMR (128 MHz, MeCN-d$_3$) δ 8.6; $^{13}$C NMR (126 MHz, MeCN-d$_3$) δ 168.8, 142.3, 62.5, 56.3, 47.7, 35.3, 26.4, 25.8; HRMS (DART-TOF) [M+H$^+$] m/z calculated for C$_{13}$H$_{20}$BN$_4$O$_4$=307.1578; m/z found=307.1583.

Scheme 10. Preparation of Borylated Thioazole (8)

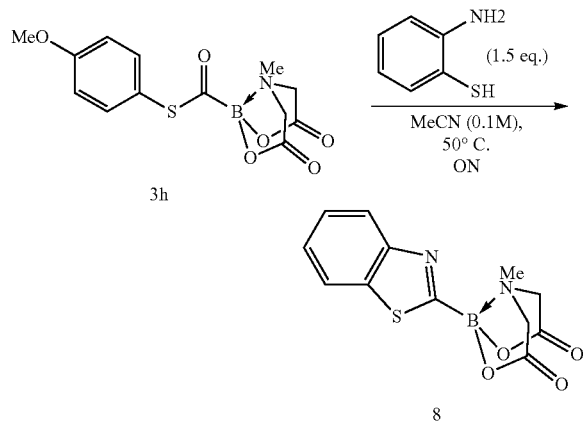

An oven-dried 2-dram vial equipped with a magnetic stir bar was charged with thiocarboboronate 3h (57 mg, 0.18 mmol, 1.0 eq.) in MeCN (3 mL, 0.6 M) under an atmosphere of N$_2$. 2-Aminobenzenethiol (28.3 μL, 0.26 mmol, 1.5 eq.) was then added via micropipette in one portion, and the reaction was stirred at 50° C. for 24 hours. The crude reaction mixture was subjected to column chromatography on silica gel eluted with a Hex:EtOAc (50:50→75:50→100:0)→75:25 (EtOAc:MeCN) to afford 8 as a white solid.

MIDA benzo[d]thiazol-2-ylboronate (8a)

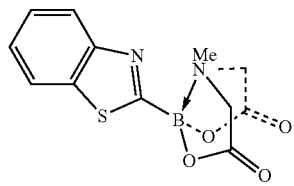

MIDA benzo[d]thiazol-2-ylboronate (8a) was isolated as a white solid; 94% yield; R$_f$=0.22 (100% EtOAc); $^1$H NMR (400 MHz, MeCN-d$_3$) δ 8.14-8.03 (m, 2H), 7.54 (m, 1H), 7.46 (m, 1H), 4.20, 4.05 (ABq, J=17.0 Hz, 4H), 2.74 (s, 3H); $^{11}$B NMR (128 MHz, MeCN-d$_3$) δ 8.8; $^{13}$C NMR (126 MHz, MeCN-d$_3$) δ 168.9, 156.9, 136.7, 127.0, 126.4, 124.2, 123.1, 62.9, 48.2; HRMS (DART-TOF) [M+H$^+$] m/z calculated for C$_{12}$H$_{12}$BN$_2$O$_4$S=291.0611; m/z found=291.0620.

Scheme 11. Preparation of Borylated Oxadiazoles (9)

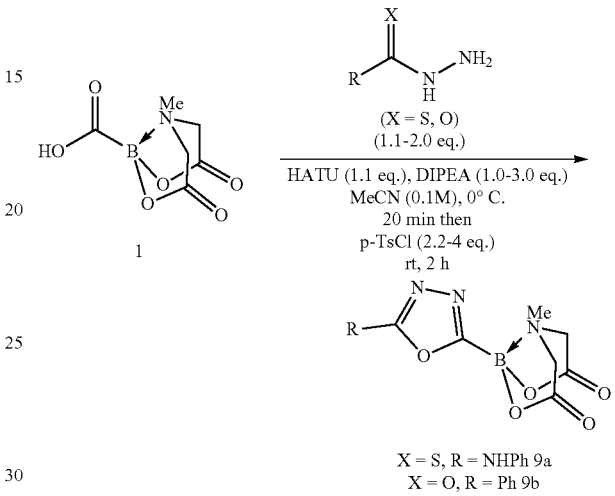

X = S, R = NHPh 9a
X = O, R = Ph 9b 1 (1.0 eq.) and HATU (1.1 eq.) were combined in an oven-dried vial under N$_2$, followed by MeCN (0.1 M). The resulting mixture was cooled to 0° C. and DIPEA (1.0-3.0 eq.) was added dropwise. The mixture was stirred at 0° C. for 5 minutes. In a separate vial, the corresponding coupling partner (1.1-2.0 eq.) was dissolved in MeCN (0.3 M). The resulting solution was added to the mixture dropwise at 0° C., which was then stirred for 20 minutes. p-TsCl (2.2-4.0 eq.) was added to the stirring mixture in one portion and the reaction was warmed to room temperature. The reaction progress was monitored by $^1$H NMR spectroscopy. Upon complete consumption of starting material as determined by $^1$H NMR spectroscopy, the mixture was loaded onto Celite, and the volatiles were removed in vacuo. The Celite residue was then subjected to column chromatography on silica gel eluted with a mixture of Ace:Hex (30:70→50:50) to afford 9.

MIDA (5-(phenylamino)-1,3,4-oxadiazol-2-yl)boronate (9a)

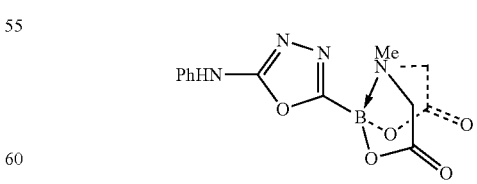

MIDA (5-(phenylamino)-1,3,4-oxadiazol-2-yl)boronate (9a) was isolated as a white solid; 64% yield; R$_f$=0.2 (1:1 Hex:Ace); $^1$H NMR (400 MHz, MeCN-d$_3$) δ 8.25 (s, 1H), 7.66-7.54 (m, 2H), 7.44-7.31 (m, 2H), 7.10-7.01 (m, 1H), 4.17 (d, J=17.1 Hz, 2H), 3.99 (d, J=17.1 Hz, 2H), 2.86 (s, 3H); $^{11}$B NMR (128 MHz, MeCN-d$_3$) δ 7.6; $^{13}$C NMR (126 MHz, MeCN-d$_3$) δ 168.6, 162.4, 139.8, 130.2, 123.3, 62.7, 48.4; HRMS (ESI+) [M+H$^+$] m/z calculated for C$_{13}$H$_{14}$BN$_4$O$_5$=316.1088; m/z found=316.1083.

MIDA (5-phenyl-1,3,4-oxadiazol-2-yl)boronate (9b)

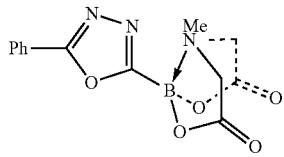

MIDA (5-phenyl-1,3,4-oxadiazol-2-yl)boronate (9b) was isolated as a white solid; 56% yield; R$_f$=0.3 (1:1 Hex:Ace); $^1$H NMR (400 MHz, MeCN-d$_3$) δ 8.10 (dd, J=8.0, 1.7 Hz, 2H), 7.64-7.54 (m, 3H), 4.22, 4.06 (ABq, J=17.2 Hz, 4H), 2.87 (s, 3H); $^{11}$B NMR (128 MHz, MeCN-d$_3$) δ 7.8; $^{13}$C NMR (101 MHz, MeCN-d$_3$) δ 168.6, 166.7, 132.8, 130.2, 128.0, 125.2, 62.9, 48.6; HRMS (DART-TOF) [M+H$^+$] m/z calculated for C$_{13}$H$_{13}$BN$_3$O$_5$=302.0948; m/z found=302.0955.

Scheme 12. Preparation of Borylated Imidazole (10)

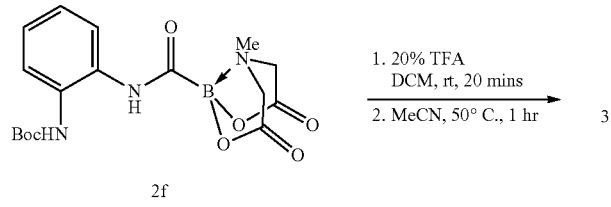

MIDA (1H-benzo[d]imidazol-2-yl)boronate (10a)

MIDA (1H-benzo[d]imidazol-2-yl)boronate (10a) was isolated as a white solid; 34% yield; R$_f$=0.25 (100% Ace); $^1$H NMR (400 MHz, MeCN-d$_3$) δ 7.84 (dd, J=6.2, 3.2 Hz, 2H), 7.55 (dd, J=6.2, 3.1 Hz, 2H), 4.29, 4.23 (ABq, J=17.2 Hz, 4H), 2.94 (s, 3H); $^{11}$B NMR (128 MHz, DMSO-d$_6$) δ 7.8; $^{13}$C NMR (101 MHz, DMSO-d$_6$) δ 168.4, 133.3, 125.4, 114.6, 62.5, 48.0; HRMS (DART-TOF) [M+H$^+$] m/z calculated for C$_{12}$H$_{13}$BN$_3$O$_4$=274.0999; m/z found=274.1003.

Scheme 13. Preparation of Borylated Thiadiazole (11)

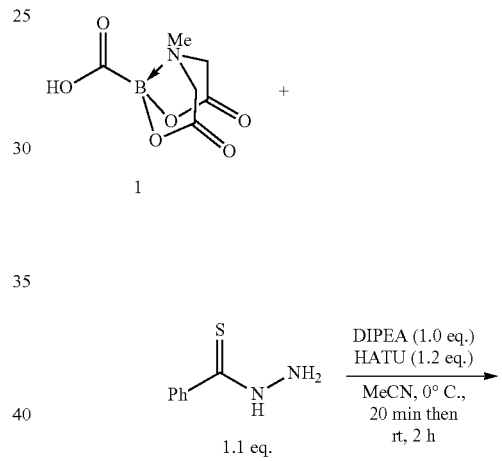

A scintillation vial equipped with a stir bar under an ambient atmosphere was charged with carbamoyl boronate (2f) (500 mg, 1.28 mmol, 1.0 eq.) and DCM (13 mL, 0.1 M). TFA (2.6 mL, 20% DCM) was subsequently added, and the reaction mixture was stirred for 20 minutes or until consumption of 2f as indicated by TLC or $^1$H NMR spectroscopy. The resulting crude product was concentrated and washed with DCM three times. Next, MeCN (13 mL, 0.1 M) was added and the reaction mixture was stirred at 50° C. for 1 hour. Upon completion, as indicated by TLC or $^1$H NMR spectroscopy, the reaction was loaded onto celite and purified by normal phase column chromatography (50:50 Ace:Hex→100:0 Ace:Hex) to afford 10 as a white solid.

1 (400 mg, 1.99 mmol, 1.0 eq.) and HATU (606 mg, 3.98 mmol, 2.0 eq.) were combined in a 50-mL flame-dried flask under a nitrogen atmosphere. MeCN (20 mL, 0.1 M) was added and the reaction mixture was cooled to 0° C., at which point DIPEA (0.35 mL, 1.99 mmol, 1.0 eq.) was added dropwise. After stirring for 5 minutes, thiohydrazide (606 mg, 3.98 mmol, 2.0 eq.) was added in one portion. The resulting mixture was then warmed to room temperature and stirred for two hours. Upon completion, as indicated by $^1$H NMR spectroscopy, the crude reaction mixture was loaded onto silica and purified by normal phase column chromatography (0:100 Ace:Hex→50:50 Ace:Hex) to afford 11 as a white solid.

MIDA (5-phenyl-1,3,4-thiadiazol-2-yl)boronate (11a)

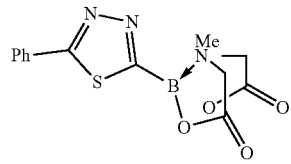

MIDA (5-phenyl-1,3,4-thiadiazol-2-yl)boronate (11a) was isolated as a white solid; 45% yield; $R_f$=0.3 (1:1 Hex:Ace); $^1$H NMR (500 MHz, MeCN-d$_3$) δ 8.07-8.02 (m, 2H), 7.57-7.49 (m, 3H), 4.23 (d, J=17.0 Hz, 2H), 4.08 (d, J=17.0 Hz, 2H), 2.81 (s, 3H); $^{11}$B NMR (128 MHz, MeCN-d$_3$) δ 8.8; $^{13}$C NMR (126 MHz, MeCN-d$_3$) δ 170.7, 168.6, 132.1, 131.1, 130.3, 129.1, 63.0, 48.5; HRMS (DART-TOF) [M+H$^+$] m/z calculated for C$_{13}$H$_{13}$BN$_3$O$_4$S=318.0720; m/z found=318.0711.

Scheme 14.
General Procedure of the SMCC Reaction with Borylated Heterocycles

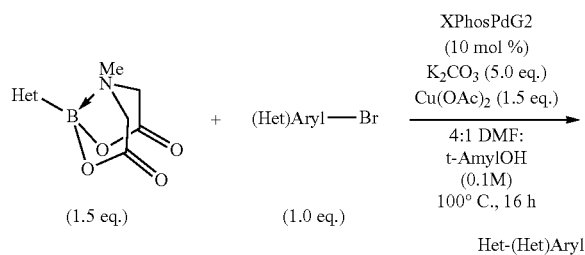

A flame-dried vial equipped with a stir bar under a nitrogen atmosphere was charged with the respective borylated heterocycle (1.5 eq.), XPhosPdG2 (10 mol %), Cu(OAc)$_2$ (1.5 eq.) and the corresponding (het)aryl bromide (1.0 eq.). The vial was then evacuated and purged with nitrogen three times. A 4:1 mixture of DMF:t-amyl alcohol (0.1 M), followed by K$_2$CO$_3$ (5.0 eq.) was added to the reaction mixture, which was subsequently stirred at 100° C. for 16 hours. Upon completion, as indicated by $^1$H NMR spectroscopy, the crude reaction mixture was filtered through a pad of celite. The filtrate was then loaded onto celite and concentrated in vacuo. The crude product was purified by column chromatography.

Scheme 15. Palladium Catalyzed Carbonylative Coupling[1]

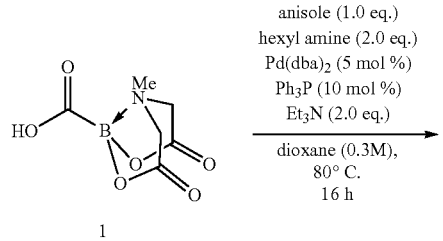

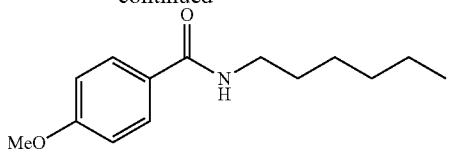

To chamber A under an argon atmosphere was added carboxyboronate (1) (19 mg, 0.1 mmol, 1.0 eq.). Chamber B, likewise under an argon atmosphere, was charged with Pd(dba)$_2$ (5 mg, 0.005 mmol, 5 mol %), Ph$_3$P (3 mg, 0.01 mmol, 10 mol %) and 4-iodoanisole (23 mg, 0.1 mmol, 1.0 eq.). Argon sparged dioxane (0.3 mL, 0.3 M) was added to both chambers. Et$_3$N (29 μL, 0.2 mmol, 2.0 eq.) and hexyl amine (26 μL, 0.2 mmol, 2.0 eq.) were added to chamber B. The reaction vessel was sealed with a microwave vial cap and the reaction was stirred at 80° C. for 16 hours. Upon completion, as indicated by $^1$H NMR, the reaction mixture was filtered and concentrated. TMB (16.8 mg, 0.1 mmol, 1.0 eq.) was added to the concentrated reaction mixture and the NMR yield was determined by $^1$H NMR to be 99%. Subsequently, the reaction mixture was subjected to normal phase column chromatography with a gradient of hexanes to 1:1 hexanes:EtOAc, to afford 12.

1 Adapted protocol: Friis, S. D.; Taaning, R. H.; Lindhardt, A. T.; Skrydstrup, T. Silacarboxylic Acids as Efficient Carbon Monoxide Releasing Molecules: Synthesis and Application in Palladium-Catalyzed Carbonylation Reactions. J. Am. Chem. Soc. 2011, 13, 18114-18117.

Although preferred embodiments of the invention have been described herein, it will be understood by those skilled in the art that variations may be made thereto without departing from the spirit of the invention or the scope of the appended claims. All documents disclosed herein are incorporated by reference.

REFERENCE LIST

[1] D. G. Hall, Ed. Boronic Acids: Preparation and Applications in Organic Synthesis, Medicine and Materials, 2$^{nd}$ Ed.; WILEY-VCH: Weinheim, 2011.

[2] For reviews, see: a) G. A. Molander, D. L. Sandrock, Curr. Opin. Drug Discovery Dev. 2009, 12, 811823; b) G. A. Molander, R. Figueroa, Aldrichimica Acta 2005, 38, 4956; c) S. Darses, J.-P. Genet, Chem. Rev. 2008, 108, 288325; d) G. A. Molander, N. Ellis, Acc. Chem. Res. 2007, 40, 275286; e) H. A. Stefani, R. Cella, A. S. Vieira, Tetrahedron 2007, 63, 36233658; f) S. Darses, J.-P. Genet, Eur. J. Org. Chem. 2003, 43134327

[3] a) T. Mancilla, R. Contreras, J. Organomet. Chem. 1986, 307, 16; b) B. Garrigues, M. Mulliez, A. Raharinirina, J. Organomet. Chem. 1986, 302, 153158; For reviews, see: c) Q. 1. Churches, Aust. J. Chem. 2011, 64, 1474; d) E. P. Gillis, M. D. Burke, Aldrichimica Acta 2009, 42, 1727.

[4] For recent examples of chemoselective transformations of organotrifluoroborates with the trifluoroborate group intact, see: a) D.-S. Kim, J. Ham, Org. Lett. 2010, 12, 10921095; b) Y. A. Cho, D.-S. Kim, H. R. Ahn, B. Canturk, G. A. Molander, J. Ham, Org. Lett. 2009, 11, 43304333; c) G. A. Molander, D. L. Sandrock, Org. Lett. 2009, 11, 23692372; d) G. A. Molander, W. Febo-Ayala, L. Jean-Gérard, Org. Lett. 2009, 11, 38303833; e) G. A. Molander, D. J. Cooper, J. Org. Chem. 2008, 73, 38853891; f) G. A. Molander, D. L. Sandrock, J. Am. Chem. Soc. 2008, 130, 1579215793; g) G. A. Molander, W. Febo-Ayala, M. Ortega-Guerra, *J. Org. Chem.* 2008, 73, 60006002; h) G. A. Molander, B. Canturk, *Org. Lett.* 2008, 10, 21352138; i) G. A. Molander, R. A. Oliveira, *Tetrahedron Lett.* 2008, 49, 12661268; j) G. A. Molander, J. Ham, B. Canturk, *Org. Lett.* 2007, 9, 821824; k) G. A. Molander, D. J. Cooper, *J. Org. Chem.* 2007, 72, 35583560; I) G. A. Molander, N. M. Ellis, *J. Org. Chem.* 2006, 71, 74917493; m) G. A. Molander, R. Figueroa, *J. Org. Chem.* 2006, 71, 61356140; n) G. A. Molander, J. Ham, *Org. Lett.* 2006, 8, 27672770; o) G. A. Molander, J. Ham, *Org. Lett.* 2006, 8, 20312034; p) G. A. Molander, D. E. Petrillo, *J. Am. Chem. Soc.* 2006, 128, 96349635; q) G. A. Molander, R. Figueroa, *Org. Lett.* 2006, 8, 7578; r) G. A. Molander, M. Ribagorda, *J. Am. Chem. Soc.* 2003, 125, 1114811149.

[5] For recent examples of chemoselective transformations of MIDA boronates with the MIDA boryl group intact, see: a) S. Fujii, S. Y. Chang, M. D. Burke, *Angew. Chem.* 2011, 123, 80088010; *Angew. Chem. Int. Ed.* 2011, 50, 78627864; b) J. E. Grob, J. Nunez, M. A. Dechantsreiter, L. G. Hamann, *J. Org. Chem.* 2011, 76, 10241-10248; c) J. R. Struble, S. J. Lee, M. D. Burke, *Tetrahedron* 2010, 66, 4710-4718; d) E. M. Woerly, A. H. Cherney, E. K. Davis, M. D. Burke, *J. Am. Chem. Soc.* 2010, 132, 6941-6943; e) S. J. Lee, T. M. Anderson, M. D. Burke, *Angew. Chem.* 2010, 122, 9044-9047; *Angew. Chem. Int. Ed.* 2010, 49, 8860-8863; f) D. M. Knapp, E. P. Gillis, M. D. Burke, *J. Am. Chem. Soc.* 2009, 131, 6961-6963; g) B. E. Uno, E. P. Gillis, M. D. Burke, *Tetrahedron* 2009, 65, 3130-3138; h) E. P. Gillis, M. D. Burke, *J. Am. Chem. Soc.* 2008, 130, 14084-14085; i) S. J. Lee, K. C. Gray, J. S. Paek, M. D. Burke, *J. Am. Chem. Soc.* 2008, 130, 466-468; j) E. P. Gillis, M. D. Burke, *J. Am. Chem. Soc.* 2007, 129, 6716-6717; k) St. Denis, J. D., He, Z. & Yudin, A. K. *ACS Catal.* 5, 5373-5379 (2015); I) Adachi, S., Liew, S. K., Lee, C. F., Lough, A., He, Z., St. Denis, J. D., Poda, G. & Yudin, A. K. *Org. Lett.* 17, 5594-5597 (2015); m) Diaz, D. B., Scully, C. C. G., Liew, S. K., Adachi, S., Trinchera, P., St. Denis, J. D. & Yudin, A. K. *Angew. Chem. Int. Ed.* 55, 12659-12663 (2016); n) Lee, C. F., Holownia, A., Bennett, J. M., Elkins, J. M., St. Denis, J. D., Adachi, S. & Yudin, A. K. *Angew. Chem. Int. Ed.* 56, 6264-6267 (2017); o) Tan, J., Cognetta III, A. B., Diaz, D. B., Lum, K. M., Adachi, S., Kundu, S., Cravatt, B. F., & Yudin A. K. *Nat. Commun.* 8, 1760 (2017); Yudin, A. K., Diaz, D. B., Tan, J. "Boroscan—A Platform for the Discovery of Boron-Containing Bioactive Molecules" Provisional application Ser. No. 10/003,192 (2016); p) Lee, C. F., Diaz, D. B., Holownia, A., Kaldas, S. J., Liew, S. K., Garrett, G. E., Dudding, T., & Yudin, A. K. *Nat. Chem.* 10, 1062-1070 (2018).

[6] a) J. D. St. Denis, Z. He, A. K. Yudin, *Org. Biomol. Chem.* 2012, in press (DOI: 10.1039/c2ob26503f); b) Z. He, A. Zajdlik, J. D. St. Denis, N. Assem, A. K. Yudin, *J. Am. Chem. Soc.* 2012, 134, 99269929; c) Z. He, A. K. Yudin, *J. Am. Chem. Soc.* 2011, 133, 13770-13773.

[7] J. Li, M. D. Burke, *J. Am. Chem. Soc.* 2011, 133, 13774-13777.

[8] Gabel, D. & El-Zaria, M. B. Product subclass19: Carboxyboranes and Related Derivatives. In *Science of Synthesis*; Kaufmann, D. E. & Matteson, D. S., Eds.;

[9] Georg Thieme Verlag: Stuttgart-New York 6, 563-583 (2005)

[10] Segawa, Y., Suzuki, Y., Yamashita, M. & Nozaki, K. *J. Am. Chem. Soc.* 130, 16069-16079 (2008)

[11] Adapted protocol: Friis, S. D.; Taaning, R. H.; Lindhardt, A. T.; Skrydstrup, T. Silacarboxylic Acids as Efficient Carbon Monoxide Releasing Molecules: Synthesis and Application in Palladium-Catalyzed Carbonylation Reactions. *J. Am. Chem. Soc.* 2011, 13, 18114-18117

Recitation of Embodiments

1. A compound of Formula (1):

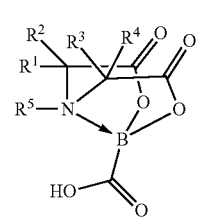

Formula (1)

wherein $R^1$, $R^2$, $R^3$, $R^4$, and $R^5$ are each independently H or an organic group.

2. The compound of embodiment 1, wherein:
$R^1$, $R^2$, $R^3$, $R^4$, and $R^5$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

3. The compound of embodiment 1, wherein the organic group is substituted with one or more halide, hydroxyl, acyloxyl or acyl group.

4. The compound of embodiment 1 or 2, wherein $R^1$, $R^2$, $R^3$, $R^4$ are H and $R^5$ is $CH_3$.

5. The compound of embodiment 1 or 2, wherein $R^1$, $R^2$, $R^3$, $R^4$ are H and $R^5$ is a long chain organic compound.

6. A compound of Formula (2):

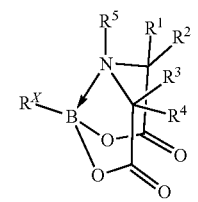

Formula (2)

wherein $R^1$, $R^2$, $R^3$, $R^4$, $R^5$, and $R^x$ are each independently H or an organic group.

7. The compound of embodiment 6, wherein $R^x$ is alkyne, alkene, or an aromatic hydrocarbon.

8. The compound of embodiment 7, wherein $R^1$, $R^2$, $R^3$, and $R^4$ are H, $R^5$ is $CH_3$, and $R^x$ is alkyne or a heterocycle.

9. A process for preparing the compound of Formula (1):

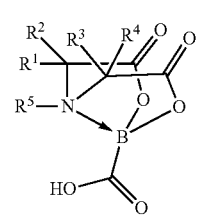

Formula (1)

comprising oxidizing the compound of Formula (2):

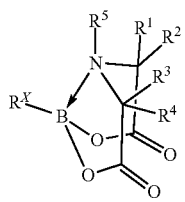

Formula (2)

wherein $R^1$, $R^2$, $R^3$, $R^4$, $R^5$, and $R^x$ are each independently H or an organic group.

10. The process of embodiment 9, wherein $R^x$ is alkyne, alkene, or an aromatic hydrocarbon.
11. The process of embodiment 10, wherein $R^1$, $R^2$, $R^3$, and $R^4$ are H, $R^5$ is $CH_3$, and $R^x$ is alkyne.
12. The process of any one of embodiments 9-11, wherein oxidizing the compound of formula (2) is performed with at least one conditions and/or reagents selected from $RuCl_3 \cdot 3H_2O$, $H_5IO_6$, MeCN, and 23° C.
13. A compound of Formula (3):

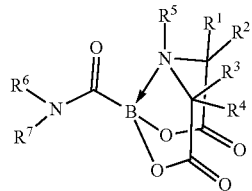

Formula (3)

wherein $R^1$, $R^2$, $R^3$, $R^4$, $R^5$, $R^6$, and $R^7$ are each independently H or an organic group.
14. The compound of embodiment 13, wherein:
$R^1$, $R^2$, $R^3$, $R^4$, $R^5$, $R^6$, and $R^7$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.
15. The compound of embodiment 13, wherein the organic group is substituted with one or more halide, hydroxyl, acyloxyl or acyl group.
16. The compound of embodiment 13 or 14, wherein $R^1$, $R^2$, $R^3$, $R^4$, $R^7$ are H, $R^5$ is $CH_3$, and $R^6$ is H or an organic group.
17. The compound of any one of embodiments 13-16, wherein $R^6$ is:

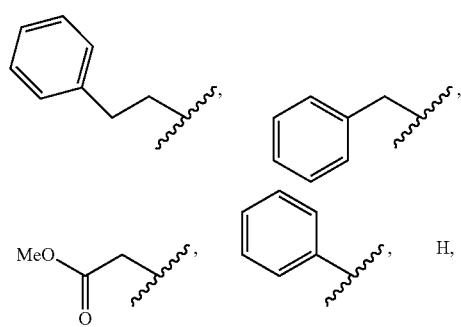

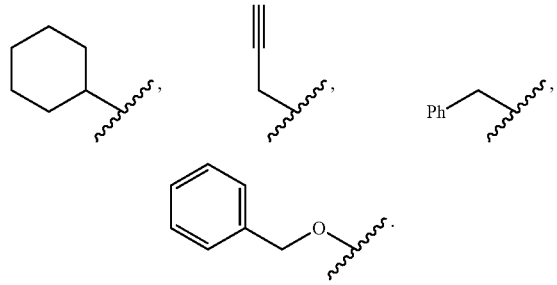

18. The compound of embodiment 13, wherein the compound is:

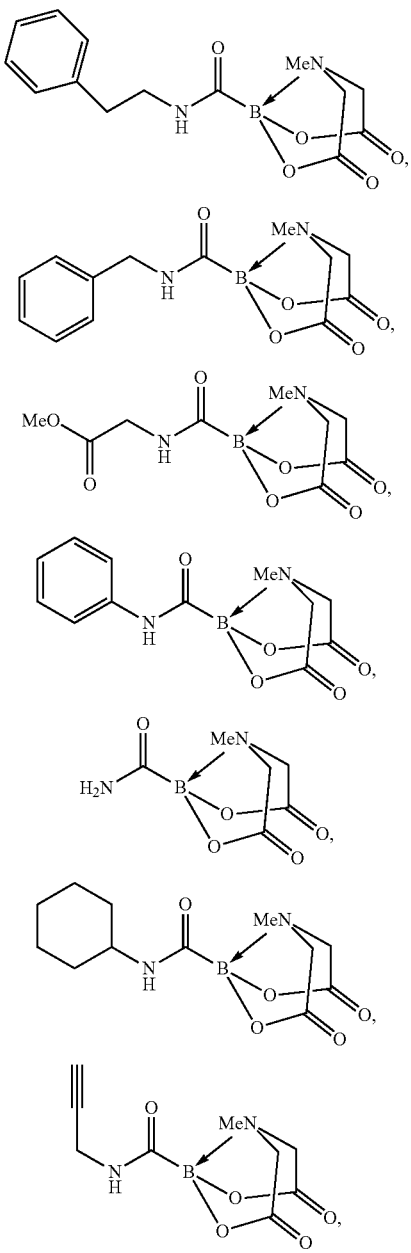

-continued

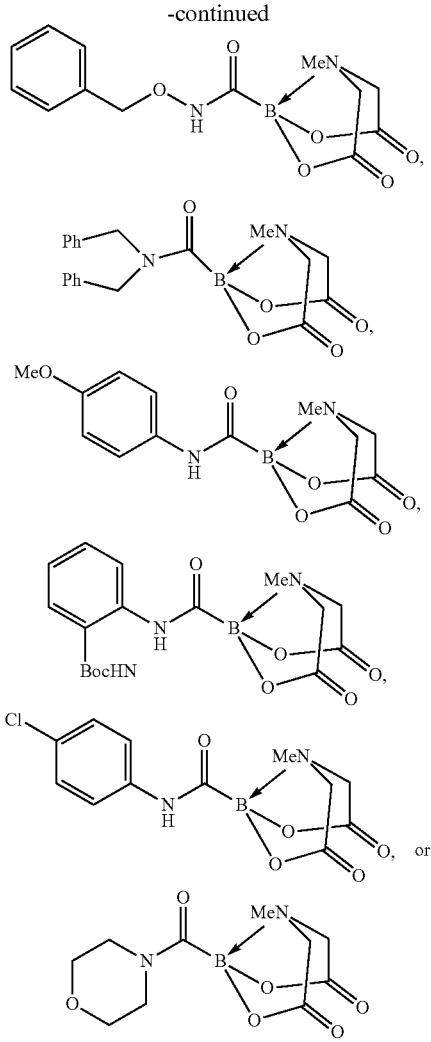

19. A process for preparing the compound of Formula (3):

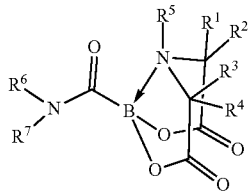
Formula (3)

comprising reacting the compound of Formula (4):

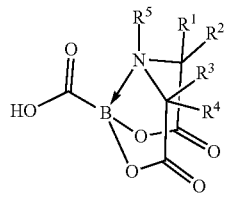
Formula (4)

wherein $R^1$, $R^2$, $R^3$, $R^4$, and $R^5$ and are each independently H or an organic group; with $HNR^6R^7$, wherein $R^6$ and $R^7$ are each independently H or an organic group.

20. The process of embodiment 19, wherein $R^1$, $R^2$, $R^3$, and $R^4$ are H, and $R^5$ is $CH_3$.

21. The process of embodiment 19 or 20, wherein reacting the compound of formula (4) with $H_2NR^6R^7$ is performed with at least one conditions and/or reagents selected from 1-[Bis(dimethylamino)methylene]-1H-1,2,3-triazolo[4,5-b]pyridinium 3-oxide hexafluorophosphate (HATU), N,N-Diisopropylethylamine (DIPEA), and MeCN, 0° C.

22. A compound of Formula (5):

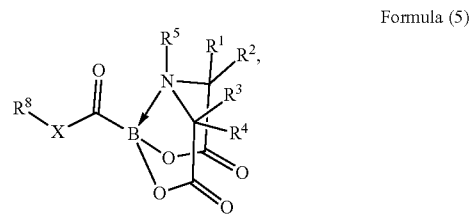
Formula (5)

wherein $R^1$, $R^2$, $R^3$, $R^4$, $R^5$, and $R^8$ are each independently H or an organic group; and X is O or S.

23. The compound of embodiment 22, wherein:
$R^1$, $R^2$, $R^3$, $R^4$, $R^5$, and $R^8$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

24. The compound of embodiment 22, wherein the organic group is substituted with one or more halide, hydroxyl, acyloxyl or acyl group.

25. The compound of embodiment 22 or 23, wherein $R^1$, $R^2$, $R^3$, $R^4$ are H and $R^5$ is $CH_3$.

26. The compound of embodiment 22, wherein $R^8$ is:

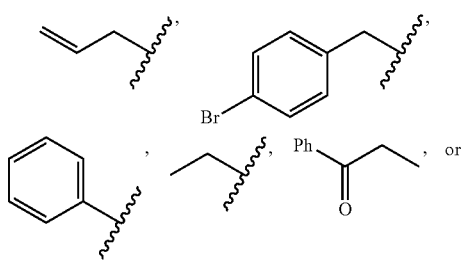

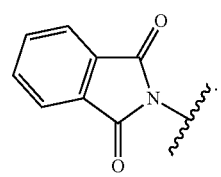

27. The compound of embodiment 22, wherein the compound is:

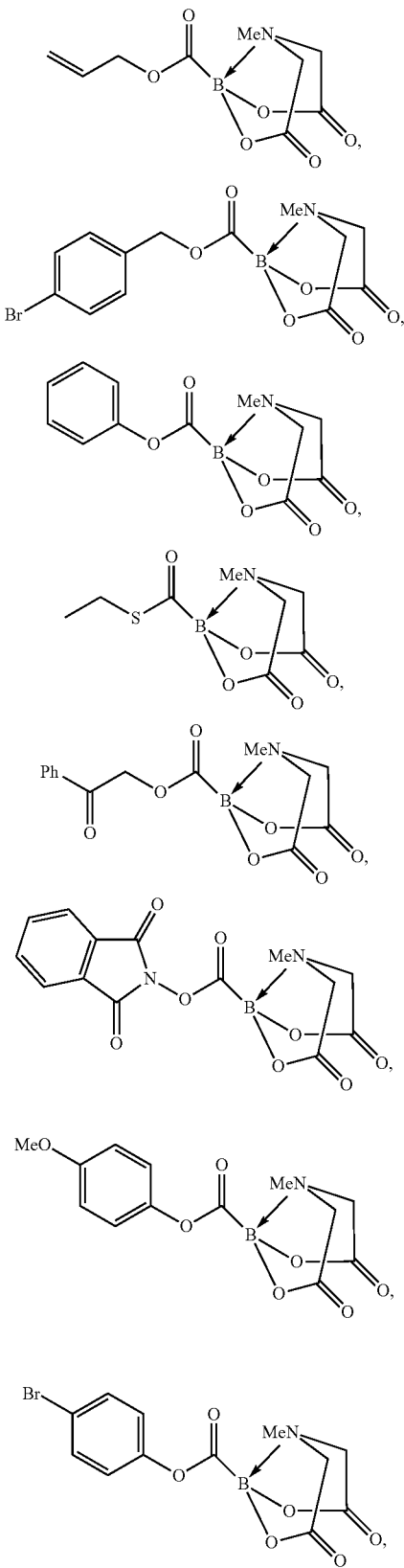

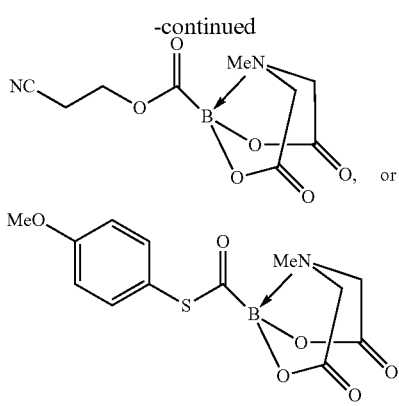

28. A process for preparing the compound of Formula (5):

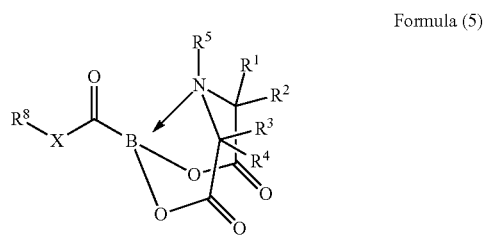

Formula (5)

comprising reacting the compound of Formula (6):

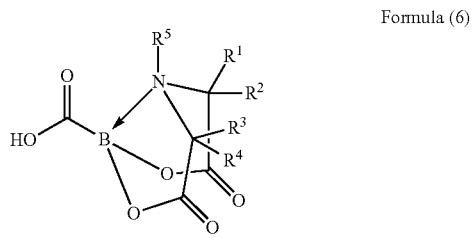

Formula (6)

wherein $R^1$, $R^2$, $R^3$, $R^4$, and $R^5$ and are each independently H or an organic group;
with X—$R^8$, wherein $R^8$ is H or an organic group, and X is O or S.

29. The process of embodiment 28, wherein $R^1$, $R^2$, $R^3$, and $R^4$ are H, and $R^5$ is $CH_3$.

30. The process of embodiment 28 or 29, wherein reacting the compound of formula (7) is performed with at least one conditions and/or reagents selected from N,N'Di-isopropylcarbodiimide (DIC), Dimethylaminopyridine (DMAP), MeCN, and temperature of 0° C. to 25° C.

31. A process for preparing the compound of Formula (5):

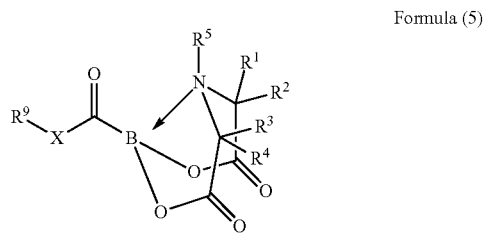

Formula (5)

comprising reacting the compound of Formula (6):

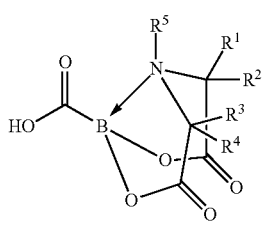

Formula (6)

wherein $R^1$, $R^2$, $R^3$, $R^4$, and $R^5$ and are each independently H or an organic group;
with Y—$R^9$, wherein $R^9$ is H or an organic group, and Y is a halogen, preferably Br, and X is O.

32. The process of embodiment 31, wherein $R^1$, $R^2$, $R^3$, and $R^4$ are H, and $R^5$ is $CH_3$.

33. The process of embodiment 31 or 32, wherein reacting the compound of Formula (6) is performed with at least one conditions and/or reagents selected from $Na_2CO_3$, Dimethyl sulfoxide (DMSO), and temperature of 0° C. to 25° C.

34. A compound of Formula (7):

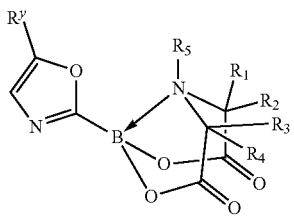

Formula (7)

wherein $R^1$, $R^2$, $R^3$, $R^4$, $R^5$, and $R^y$ are each independently H or an organic group.

35. The compound of embodiment 34, wherein $R^1$, $R^2$, $R^3$, $R^4$, $R^5$, and $R^y$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

36. The compound of embodiment 34, wherein the organic group is substituted with one or more halide, hydroxyl, acyloxyl or acyl group.

37. The compound of embodiment 34 or 35, wherein $R^1$, $R^2$, $R^3$, $R^4$ are H and $R^5$ is $CH_3$.

38. A process for preparing the compound of Formula (7):

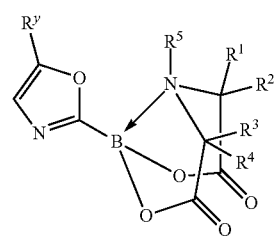

Formula (7)

comprising oxidizing the compound of Formula (8):

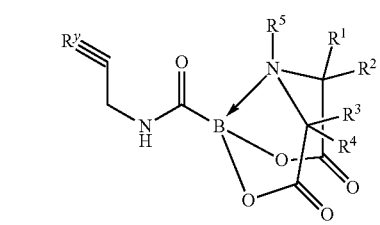

Formula (8)

wherein $R^1$, $R^2$, $R^3$, $R^4$, $R^5$, and $R^y$ are each independently H or an organic group.

39. The process of embodiment 38, wherein $R^1$, $R^2$, $R^3$, and $R^4$ are H, and $R^5$ is $CH_3$.

40. The process of embodiment 38 or 39, wherein reacting the compound of Formula (8) is performed with at least one conditions and/or reagents selected from $AuCl_3$ (5 mol %), MeCN, and temperature of 45° C., 2 hours.

41. A compound of Formula (9):

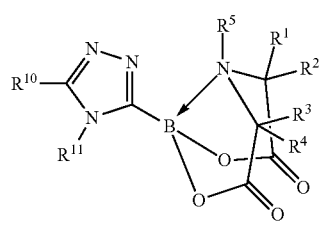

Formula (9)

wherein $R^1$, $R^2$, $R^3$, $R^4$, $R^5$, $R^{10}$, and $R^{11}$ are each independently H or an organic group.

42. The compound of embodiment 41, wherein $R^1$, $R^2$, $R^3$, $R^4$, $R^5$, $R^{10}$, and $R^{11}$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

43. The compound of embodiment 41, wherein the organic group is substituted with one or more halide, hydroxyl, acyloxyl or acyl group.

44. The compound of embodiment 41, wherein $R^1$, $R^2$, $R^3$, $R^4$ are H, $R^5$ is $CH_3$, and $R^{10}$, and $R^{11}$ are each independently a Phenyl group.

45. A process for preparing the compound of Formula (9):

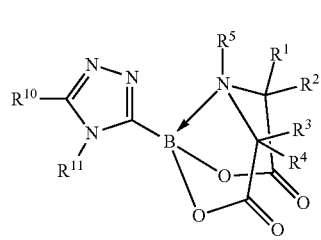

Formula (9)

comprising reacting the compound of Formula (10):

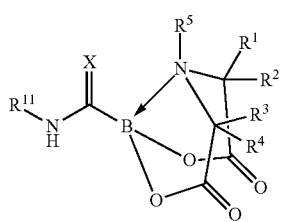

Formula (10)

with the compound of Formula (11):

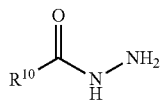

Formula (11)

wherein $R^1$, $R^2$, $R^3$, $R^4$, $R^5$, $R^{10}$, and $R^{11}$ are each independently H or an organic group, and X is O or S.

46. The process of embodiment 45, wherein $R^1$, $R^2$, $R^3$, and $R^4$ are H, $R^5$ is $CH_3$, and $R^{10}$ and $R^{11}$ are each independently a phenyl group, and X is O.

47. The process of embodiment 45 or 46, wherein reacting the compound of Formula (10) is performed with at least one conditions and/or reagents selected from $Tf_2O$, 2-ClPyr, 1,2-Dichloroethene (DCE), temperature of 90° C., 2 hours.

48. The process of embodiment 45, wherein $R^1$, $R^2$, $R^3$, $R^4$, and $R^{10}$ are H, $R^5$ is $CH_3$, and $R^{11}$ is a phenyl group, and X is S.

49. The process of embodiment 42 or 48, wherein reacting the compound of Formula (11) is performed with at least one conditions and/or reagents selected from AgOAc (2.2 eq.), MeCn, temperature of 27° C., 2.5 hours.

50. A compound of Formula (12)

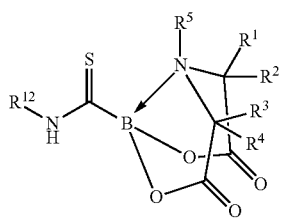

Formula (12)

wherein $R^1$, $R^2$, $R^3$, $R^4$, $R^5$, $R^{10}$, and $R^{12}$ are each independently H or an organic group.

51. The compound of embodiment 50, wherein $R^1$, $R^2$, $R^3$, $R^4$, $R^5$, and $R^{12}$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

52. The compound of embodiment 50, wherein the organic group is substituted with one or more halide, hydroxyl, acyloxyl or acyl group.

53. The compound of embodiment 50, wherein $R^1$, $R^2$, $R^3$, $R^4$ are H, $R^5$ is $CH_3$, and $R^{12}$ is a Phenyl group.

54. A process for preparing the compound of Formula (12):

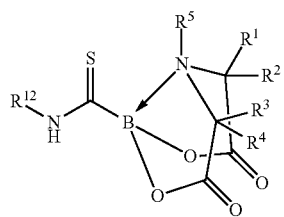

Formula (12)

comprising reducing the compound of Formula (13):

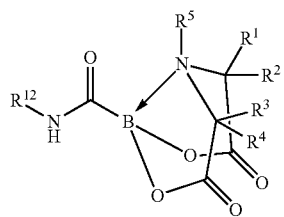

Formula (13)

wherein $R^1$, $R^2$, $R^3$, $R^4$, $R^5$, and $R^{12}$ are each independently H or an organic group.

55. The process of embodiment 54, wherein $R^1$, $R^2$, $R^3$, and $R^4$ are H, $R^5$ is $CH_3$, and $R^{12}$ is a phenyl group.

56. The process of embodiment 54 or 55, wherein reacting the compound of Formula (13) is performed with at least one conditions and/or reagents selected from Lawesson's reagent (0.6 eq.), toluene (0.1 M), temperature of 90° C., 16 hours.

57. A compound of Formula (14):

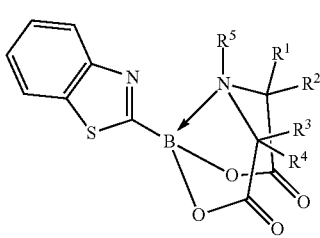

Formula (14)

wherein $R^1$, $R^2$, $R^3$, $R^4$, $R^5$, are each independently H or an organic group.

58. The compound of embodiment 57, wherein $R^1$, $R^2$, $R^3$, $R^4$, and $R^5$, are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

59. The compound of embodiment 58, wherein the organic group is substituted with one or more halide, hydroxyl, acyloxyl or acyl group.

60. The compound of embodiment 58 or 59, wherein $R^1$, $R^2$, $R^3$, $R^4$ are H and $R^5$ is $CH_3$.

61. A process for preparing the compound of Formula (14):

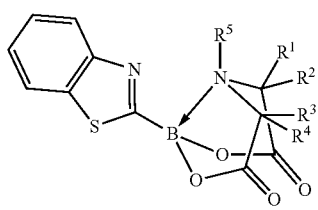

Formula (14)

comprising reducing the compound of Formula (15):

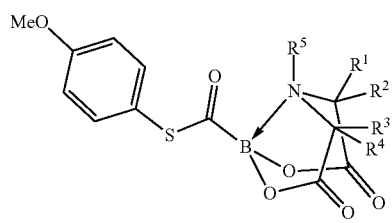

Formula (15)

wherein $R^1$, $R^2$, $R^3$, $R^4$, and $R^5$ are each independently H or an organic group.

62. The process of embodiment 61, wherein $R^1$, $R^2$, $R^3$, $R^4$, and $R^{13}$ are H, $R^5$ is $CH_3$, and $R^{14}$ is a phenyl group.

63. The process of embodiment 61 or 62, wherein reducing the compound of Formula (15) is performed with at least one conditions and/or reagents selected from MeCN (0.1 M), temperature of 50° C., Aminobenzenethiol, atmosphere of $N_2$.

64. A compound of Formula (16):

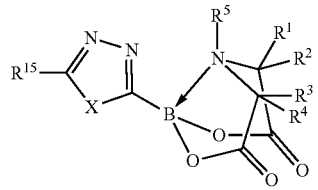

Formula (16)

wherein $R^1$, $R^2$, $R^3$, $R^4$, $R^5$, $R^{10}$, and $R^{15}$ are each independently H or an organic group, and X is O or S.

65. The compound of embodiment 64, wherein $R^1$, $R^2$, $R^3$, $R^4$, $R^5$, and $R^{15}$ are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

66. The compound of embodiment 64, wherein the organic group is substituted with one or more halide, hydroxyl, acyloxyl or acyl group.

67. The compound of embodiment 64, wherein $R^1$, $R^2$, $R^3$, $R^4$ are H, $R^5$ is $CH_3$, and $R^{15}$ is NHPh or Phenyl.

68. A process for preparing the compound of Formula (16):

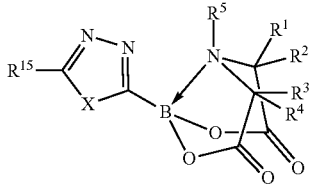

Formula (16)

comprising reacting the compound of Formula (17):

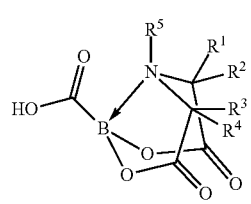

Formula (17)

with the compound of Formula (18):

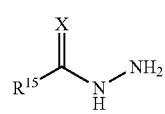

Formula (18)

wherein $R^1$, $R^2$, $R^3$, $R^4$, $R^5$, $R^{10}$, and $R^{15}$ are each independently H or an organic group, and X is S or O.

69. The process of embodiment 68, wherein $R^1$, $R^2$, $R^3$, and $R^4$ are H, $R^5$ is $CH_3$, $R^{15}$ is a phenyl group or NHPh, and X is O.

70. The process of embodiment 68, wherein $R^1$, $R^2$, $R^3$, and $R^4$ are H, $R^5$ is $CH_3$, $R^{15}$ is a phenyl group, and X is S.

71. The process of any one of embodiments 68-70, wherein reacting the compound of Formula (17) is performed with at least one conditions and/or reagents selected from 1-[Bis(dimethylamino)methylene]-1H-1,2,3-triazolo[4,5-b]pyridinium 3-oxide hexafluorophosphate (HATU), N,N-Diisopropylethylamine (DIPEA), MeCN, temperature of 0° C., 20 minutes, p-Toluenesulfonyl chloride, temperature of 27° C., 2 hours 72. A compound of Formula (19):

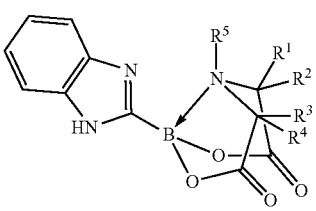

Formula (19)

wherein $R^1$, $R^2$, $R^3$, $R^4$, $R^5$, are each independently H or an organic group.

73. The compound of embodiment 72, wherein $R^1$, $R^2$, $R^3$, $R^4$, and $R^5$, are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

74. The compound of embodiment 72, wherein the organic group is substituted with one or more halide, hydroxyl, acyloxyl or acyl group.

75. The compound of any one of embodiments 72-74, wherein $R^1$, $R^2$, $R^3$, $R^4$ are H and $R^5$ is $CH_3$.

76. A process for preparing the compound of Formula (19):

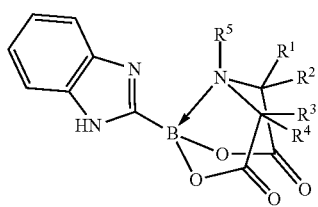

Formula (19)

comprising reducing the compound of Formula (20):

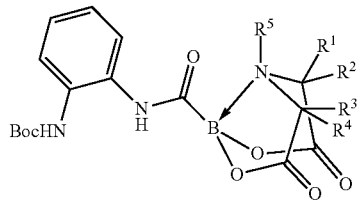

Formula (20)

wherein $R^1$, $R^2$, $R^3$, $R^4$, and $R^5$ are each independently H or an organic group.

77. The process of embodiment 76, wherein $R^1$, $R^2$, $R^3$, $R^4$, and $R^{13}$ are H, $R^5$ is $CH_3$.

78. The process of embodiment 76 or 77, wherein reducing the compound of Formula (20) is performed with at least one conditions and/or reagents selected from 20% Trifluoroacetic acid (TFA), Dichloromethane (DCM), temperature of 27° C., 20 minutes, MeCN, temperature of 50° C., 1 hour.

The invention claimed is:

1. A compound of Formula (1):

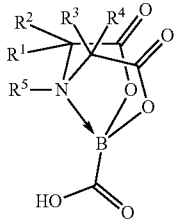

Formula (1)

wherein $R^1$, $R^2$, $R^3$, and $R^4$ are each independently H or an organic group;

wherein $R^5$ is H, $CH_3$, an alkyl group, an heteroalkyl group, an alkenyl group, a heteroalkenyl group, an alkynyl group, a heteroalkynyl group, or an acyl group.

2. The compound of claim 1, wherein:
$R^1$, $R^2$, $R^3$, and $R^4$, are each independently selected from the group consisting of H, an alkyl group, a heteroalkyl group, a cycloalkyl group, an alkenyl group, a heteroalkenyl group, an alkynyl group, a heteroalkynyl group, an aryl group, a heteroaryl group, a heterocyclic group, and an acyl group.

3. The compound of claim 1, wherein the organic group is substituted with one or more halide, hydroxyl, acyloxyl or acyl group.

4. The compound of claim 1, wherein $R^1$, $R^2$, $R^3$, $R^4$ are H and $R^5$ is $CH_3$.

5. The compound of claim 1, wherein $R^1$, $R^2$, $R^3$, $R^4$ are H and $R^5$ is a long chain alkyl group, heteroalkyl group, alkenyl group, heteroalkenyl group, alkynyl group, heteroalkynyl group, or acyl group.

* * * * *